United States Patent
Zhu et al.

(10) Patent No.: US 9,904,458 B2
(45) Date of Patent: Feb. 27, 2018

(54) METHOD FOR INFORMATION PROCESSING AND ELECTRONIC APPARATUS THEREOF

(71) Applicant: Lenovo (Beijing) Co., Ltd., Beijing (CN)

(72) Inventors: Shaofeng Zhu, Beijing (CN); Lijun Lin, Beijing (CN)

(73) Assignee: Lenovo (Beijing) Co., Ltd., Beijing (CN)

( * ) Notice: Subject to any disclaimer, the term of this patent is extended or adjusted under 35 U.S.C. 154(b) by 652 days.

(21) Appl. No.: 14/228,735

(22) Filed: Mar. 28, 2014

(65) Prior Publication Data

US 2015/0234556 A1    Aug. 20, 2015

(30) Foreign Application Priority Data

Feb. 17, 2014  (CN) .......................... 2014 1 0053603
Feb. 18, 2014  (CN) .......................... 2014 1 0055174

(51) Int. Cl.
  *G06F 3/048*   (2013.01)
  *G06F 3/0488*  (2013.01)
  *G06F 3/0484*  (2013.01)

(52) U.S. Cl.
  CPC .......... *G06F 3/0488* (2013.01); *G06F 3/0484* (2013.01)

(58) Field of Classification Search
  CPC ........................... G06F 3/0484; G06F 3/04883
  See application file for complete search history.

(56) References Cited

U.S. PATENT DOCUMENTS 5,666,498 A * 9/1997 Amro .................. G09G 5/14
                                                      715/764
9,164,638 B2   10/2015 Fang et al.
(Continued)

FOREIGN PATENT DOCUMENTS

CN    102422247 A    4/2012
CN    102945115 A    2/2013
(Continued)

OTHER PUBLICATIONS

First Chinese Office Action regarding Application No. 201410053603.8 dated May 3, 2016.
(Continued)

*Primary Examiner* — William Bashore
*Assistant Examiner* — Gregory A Distefano
(74) *Attorney, Agent, or Firm* — Harness, Dickey & Pierce, P.L.C.

(57) ABSTRACT

A method for information processing is provided in the disclosure. The method includes: acquiring a first operation of a user; determining a first application and generating a first instruction based on the first operation, wherein the first instruction is adapted to set the first application to a first mode; setting the first application to the first mode based on the first instruction; acquiring a second operation of the user; generating a second instruction based on the second operation; not distributing the second instruction to the first application in the case where it is determined that the second operation belongs to a first type of operation event; and distributing the second instruction to a corresponding application in the case where it is determined that the second operation does not belong to the first type of operation event. An electronic apparatus is further provided in the disclosure.

8 Claims, 13 Drawing Sheets

(56) References Cited

U.S. PATENT DOCUMENTS

| | | | |
|---|---|---|---|
| 2008/0066006 A1* | 3/2008 | Kim | G06F 3/0481 715/781 |
| 2009/0164936 A1* | 6/2009 | Kawaguchi | G06F 3/0481 715/788 |
| 2010/0313156 A1* | 12/2010 | Louch | G06F 3/0481 715/769 |
| 2012/0013562 A1 | 1/2012 | Jyonoshita et al. | |
| 2012/0032917 A1 | 2/2012 | Yamaguchi | |
| 2012/0127086 A1* | 5/2012 | Li | G06F 3/04812 345/173 |
| 2013/0050109 A1* | 2/2013 | Ban | G06F 3/04817 345/173 |
| 2014/0092067 A1 | 4/2014 | Fang et al. | |
| 2014/0165000 A1 | 6/2014 | Fleizach et al. | |

FOREIGN PATENT DOCUMENTS

| | | | |
|---|---|---|---|
| CN | 102970213 A | 3/2013 | |
| CN | 103064735 A | 4/2013 | |
| CN | 103246433 A | 8/2013 | |
| WO | WO-2010110459 A1 | 9/2010 | |
| WO | WO-2012174797 A1 | 12/2012 | |

OTHER PUBLICATIONS

First Chinese Office Action regarding Application No. 201410055174.8 dated May 18, 2016.

* cited by examiner

```
┌─────────────────────────────────────────────────────────────────────┐ 201
│              acquire a first operation of a user                    │
└─────────────────────────────────────────────────────────────────────┘
                                    ▼
┌─────────────────────────────────────────────────────────────────────┐ 202
│  determine a first application and generate a first instruction based on the first │
│  operation, wherein the first instruction is adapted to set the first application to │
│                              a first mode                           │
└─────────────────────────────────────────────────────────────────────┘
                                    ▼
┌─────────────────────────────────────────────────────────────────────┐ 203
│  determine a second application in an activated state and a first value of a first │
│  parameter of the second application based on the first instruction, and modify a │
│  value of a first parameter value of the first application to be larger than the first │
│                                 value                               │
└─────────────────────────────────────────────────────────────────────┘
                                    ▼
┌─────────────────────────────────────────────────────────────────────┐ 204
│  acquire a second operation of the user and generate a second instruction based │
│                        on the second operation                      │
└─────────────────────────────────────────────────────────────────────┘
                                    ▼
┌─────────────────────────────────────────────────────────────────────┐ 205
│  not distribute the second instruction to the first application in the case where it │
│     is determined that the second operation belongs to a first type of operation │
│                                event                                │
└─────────────────────────────────────────────────────────────────────┘
                                    ▼
┌─────────────────────────────────────────────────────────────────────┐ 206
│  distribute the second instruction to a corresponding application in the case │
│    where it is determined that the second operation does not belong to the first │
│                         type of operation event                     │
└─────────────────────────────────────────────────────────────────────┘
```

Figure 2

METHOD FOR INFORMATION PROCESSING AND ELECTRONIC APPARATUS THEREOF

The present application claims the priority to Chinese Patent Application No. 201410053603.8, entitled as "METHOD FOR INFORMATION PROCESSING AND ELECTRONIC apparatus THEREOF", filed on Feb. 17, 2014 with State Intellectual Property Office of People's Republic of China, which is incorporated herein by reference in its entirety.

The present application claims the priority to Chinese Patent Application No. 201410055174.8 entitled as "METHOD FOR INFORMATION PROCESSING AND ELECTRONIC apparatus THEREOF", filed on Feb. 18, 2014 with State Intellectual Property Office of People's Republic of China, which is incorporated herein by reference in its entirety.

FIELD

The present disclosure relates to the electronic technology, and particularly to an method for information processing and an electronic apparatus thereof.

BACKGROUND

In the early development of electronic apparatus, screens of the electronic apparatus have a smaller size and a lower resolution. During this period, an operating system of mobile terminals, such as Android operating system, provides single-window application functionality on itself, and only one application may be displayed within this single-window. That is, operating system allows only one application to be in a foreground and to interact with the user. A state of the application in the foreground is called an Activity State, and a state of the application interacting with the user is called a Resumed State. However, with the rapid development of mobile terminal hardware, especially the improvement of the screen resolution and the increasing of the size, this single-window application in an operating system of early electronic apparatus is not able to meet the needs of users, and it becomes an urgent need for the users that the operate system of electronic apparatus may provide multi-window application functionality. For example, while users are watching a video by using a mobile terminal such as a tablet PC, they also would like to chat with their relatives and friends on a timely chat tools such as QQ. Then two or more windows are needed to be simultaneously displayed on the display interface of the tablet PC, where each window is adapted to display an application.

In the electronic apparatus providing multi-window application functionality, sometimes users would like to make one small window of multi-windows to display on the top layer, i.e., one small window thereof is topped. For example, the video and web pages are simultaneously displayed in a small window mode by a user. At this time, the user would like to top the video, so that there is no affect on watching videos when browsing the web. However, the electronic apparatus providing multi-window application functionality now does not provide a topping function, which will obviously affect the user's experience.

Further, when applications of an electronic apparatus are started, a corresponding operating system such as an Android operating system takes charge of displaying the started applications on a full-screen window or two split-screen windows. Taking the two split-screen windows in which an application corresponding to one of the windows is Fruit Ninja game as an example, in the case where a user carries out a sliding operation at a certain position on this window, the electronic apparatus tends to determine that this operation corresponds to an operation on the application such as a cutting operation on a watermelon performed by the user, whereas the user actually wants to remove the window position of the application window. There is no relevant solution to the problem described above.

SUMMARY

In view of the above mentioned, in order to solve the problems in the conventional technology, an information processing method and an electronic apparatus are provided in the embodiments of the disclosure, so as to achieve a topping function, and improve a user's experience.

The technical solution of the embodiments of the disclosure may be implemented as follows.

The disclosure provides a method for information processing applied in an electronic apparatus with a touch display unit, wherein a plurality of applications are run on the electronic apparatus, each of the applications is displayed on the touch display unit through a full-screen window mode or a small window mode; a display area of the full-screen window is equal to an area in which a touch event is acceptable by the touch display unit; a display area of the small window is smaller than the area in which a touch event is acceptable by the touch display unit, the display area of the small window is smaller than the display area of the full-screen window; the small window is acquired through transforming the full-screen window by using a first transforming parameter, wherein the first transforming parameter at least includes a parameter, a matrix, a parameter group and a parameter set or the method includes:

acquiring a first operation of a user;

determining a first application and generating a first instruction based on the first operation, the first instruction being adapted to set the first application to a first mode;

setting the first application to the first mode based on the first instruction; acquiring a second operation of the user;

generating a second instruction based on the second operation;

not distributing the second instruction to the first application in the case where it is determined that the second operation belongs to a first type of operation event; and distributing the second instruction to a corresponding application in the case where it is determined that the second operation does not belong to the first type of operation event.

The first type of operation event comprises a key-pressing operation event.

After the first application is set to the first mode, in the case where the number of application windows displayed on the touch display unit is over two and there is an overlapping region between a first window for displaying the first application and other small windows displayed on the touch display unit, the method further includes:

displaying the first window entirely on the touch display unit.

Distributing the second instruction to a corresponding application in the case where it is determined that the second operation does not belong to the first type of operation event includes:

determining an operation coordinate of the second operation on the touch display unit based on the second operation;

judging whether the operation coordinate is within the overlapping region; and distributing the second instruction to the first application in the case where it is judged that the operation coordinate is within the overlapping region.

The method further including:

determining a second application in an resumed state in the case where it is determined that the second operation belongs to the first type of operation event; and distributing the second instruction to the second application.

An electronic apparatus with a touch display unit, wherein a plurality of applications are run on the electronic apparatus, each of the applications is displayed on the touch display unit through a full-screen window mode or a small window mode; a display area of the full-screen window is equal to an area in which a touch event is acceptable by the touch display unit; a display area of the small window is smaller than the area in which a touch event is acceptable by the touch display unit, the display area of the small window is smaller than the display area of the full-screen window; the small window is acquired through transforming the full-screen window by using a first transforming parameter, wherein the first transforming parameter at least includes a parameter, a matrix, a parameter group or a parameter set;

the electronic apparatus includes: a first acquiring device, a first generating device, a setting device, a second acquiring device, a second generating device, a first distributing device and a second distributing device, wherein:

the first acquiring device is adapted to acquire a first operation of a user;

the first generating device is adapted to determine a first application and generate a first instruction based on the first operation, the first instruction being adapted to set the first application to a first mode;

the setting device is adapted to set the first application to the first mode based on the first instruction;

the second acquiring device is adapted to acquire a second operation of the user;

the second generating device is adapted to generate a second instruction based on the second operation;

the first distributing device is adapted to not distribute the second instruction to the first application in the case where it is determined that the second operation belongs to a first type of operation event; and the second distributing device is adapted to distribute the second instruction to a corresponding application in the case where it is determined that the second operation does not belong to the first type of operation event.

The first type of operation event includes a key-pressing operation event.

After the first application is set to 6 the first mode, in the case where the number of application windows displayed on the touch display unit is over two and there is an overlapping region between a first window for displaying the first application and other small windows displayed on the touch display unit, the electronic apparatus further includes a display device adapted to display the first window entirely on the display unit.

In the case where the second operation is a touch operation and does not belong to the first type of operation event, the second distributing device includes a second determining unit, a judging unit and a distributing unit, wherein:

the second determining unit is adapted to determine an operation coordinate of the second operation on the touch display unit based on the second operation;

the judging unit is adapted to judge whether the operation coordinate is within the overlapping region; and the distributing unit is adapted to distribute the second instruction to the first application in the case where it is judged that the operation coordinate is within the overlapping region.

The electronic apparatus further including: a third distributing device, which is adapted to determine a second application in a resumed state and distribute the second instruction to the second application in the case where it is determined that the second operation belongs to the first type of operation event.

A method for information processing applied in an electronic apparatus, wherein the electronic apparatus includes a display unit on which M first applications are run, the electronic apparatus executes a first instruction and displays N first small windows on the display unit; the N first small windows correspond to N first applications among the M first applications to make each of the N first applications displayed on a corresponding first small window, the first small window is obtained through transforming a full-screen window by using a first transformation parameter, wherein the first transforming parameter at least includes a parameter, a matrix, a parameter group or a parameter set; either of M or N is a positive integer; in the case where a first application is displayed on the display unit through the corresponding first small window, a response mode of the first small window includes a first response mode and a second response mode;

the method further includes:

acquiring a first operation on the first small window;

acquiring an attribute parameter of a current first small window, the attribute parameter indicating the response mode of the first small window;

generating a first instruction based on the first operation and adjusting an arrangement of the first small window on the display unit in response to the first instruction in the case where the acquired attribute parameter indicates that the first small window is in the first response mode;

generating a second instruction based on the first operation and distributing the second instruction to the first application being run in the first small window in response to the second instruction to make the first application respond to the second instruction in the case where the acquired attribute parameter indicates that the first small window is in the second response mode.

Adjusting the arrangement of the first small window on the display unit includes at least:

adjusting a displaying area of the first small window on the display unit; or adjusting a window size of the first small window in the case where the first small window is displayed on the display unit; or adjusting a displayed or hidden state of the first small window on the display unit.

The method further includes:

acquiring a second operation on the first small window, the second operation indicating a switch of the response mode;

acquiring the attribute parameter of the current first small window, the attribute parameter indicating the response mode of the first small window;

switching the first small window from the first response mode to the second response mode in response to the second operation in the case where the attribute parameter indicates that the first small window is in the first response mode; and switching the first small window from the second response mode to the first response mode in response to the second operation in the case where the attribute parameter indicates that the first small window is in the second response mode.

The second operation includes at least one of a touch operation, a key pressing operation, a gesture operation or a voice operation.

An electronic apparatus, including a display unit on which M first applications can are run, wherein the electronic apparatus executes a first instruction, N first small windows are displayed on the display unit, the N first small windows correspond to N first applications among the M first applications to make each of the N first applications displayed on a corresponding first small window, the first small window is obtained through transforming a full-screen window by using a first transformation parameter, wherein the first transforming parameter at least includes a parameter, a matrix, a parameter group or a parameter set; either of M or N is a positive integer; in the case where a first application is displayed on the display unit through the corresponding first small window, a response mode of the first small window includes a first response mode and a second response mode;

the electronic apparatus further includes a first acquiring unit, a second acquiring unit, a first generating unit, an adjusting unit, a second generating unit and a distributing unit; wherein, the first acquiring unit is adapted to acquire a first operation on the first small window;

the second acquiring unit is adapted to acquire an attribute parameter of a current first small window, the attribute parameter indicates the response mode of the first small window;

the first generating unit is adapted to generate a first instruction based on the first operation in the case where the acquired attribute parameter indicates that the first small window is in the first response mode;

the adjusting unit is adapted to adjust an arrangement of the first small window on the display unit in response to the first instruction;

the second generating unit is adapted to generate a second instruction based on the first operation in the case where the acquired attribute parameter indicates that the first small window is in the second response mode;

the distributing unit is adapted to distribute the second instruction to the first application being run on the first small window in response to the second instruction to make the first application respond to the second instruction.

The adjusting unit is further adapted to adjust a displaying area of the first small window on the display unit; or to adjust a window size of the first small window in the case where the first small window is displayed on the display unit; or to adjust the displayed or hidden state of the first small window on the display unit.

The electronic apparatus further includes a third acquiring unit, a fourth acquiring unit, a first switching unit and a second switching unit; wherein, the third acquiring unit is adapted to acquire the second operation on the first small window, the second operation indicates a switch of the response mode;

the fourth acquiring unit is adapted to acquire the attribute parameter of the current first small window, the attribute parameter indicates the response mode of the first small window;

the first switching unit is adapted to switch the first small window from the first response mode to the second response mode in response to the second operation in the case where the attribute parameter indicates that the first small window is in the first response mode;

the second switching unit is adapted to switch the first small window from the second response mode to the first response mode in response to the second operation in the case where the attribute parameter indicates that the first small window is in the second response mode.

The second operation includes at least one of a touch operation, a key pressing operation, a gesture operation or a voice operation.

In the embodiment provided in the disclosure, a first operation of a user is acquired; a first application is determined and a first instruction is generated based on the first operation, wherein the first instruction is adapted to set the first application to a first mode; the first application is set to the first mode based on the first instruction; a second operation of the user is acquired and a second instruction is generated based on the second operation; the second instruction is not distributed to the first application in the case where it is determined that the second operation belongs to a first type of operation event; and the second instruction is distributed to a corresponding application in the case where it is determined that the second operation does not belong to the first type of operation event. Therefore, the topping function may be achieved, and the user's experience is improved.

Further, an embodiment of the disclosure provides a method for information processing and an electronic apparatus thereof. The method is applied in the electronic apparatus. In the case where a first application of the electronic apparatus is displayed on a display unit of the electronic apparatus through a corresponding first small window, a response mode of the first small window includes a first response mode and a second response mode. The first small window is obtained through transforming a full-screen window by using a first transformation parameter. A first operation on the first small window is acquired. An attribute parameter of a current first small window is acquired, and the attribute parameter indicates the response mode of the first small window. In the case where the acquired attribute parameter indicates that the first small window is in the first response mode, a first instruction is generated based on the first operation, and an arrangement of the first small window on the display unit is adjusted in response to the first instruction. In the case where the acquired attribute parameter indicates that the first small window is in the second response mode, a second instruction is generated based on a first operation, and the second instruction is distributed to the first application being run on the first small window in response to the second instruction, so that the first application responds to the second instruction. By applying the technology of an embodiment of the disclosure, it is achievable to distinguish between an operation on the window and an operation on the application, the user's experience is improved and the humanity of the electronic apparatus is also embodied.

BRIEF DESCRIPTION OF THE DRAWINGS

FIG. 2 is a schematic flowchart for a method for information processing according to an embodiment of the disclosure;

DETAILED DESCRIPTION

Figure 1:
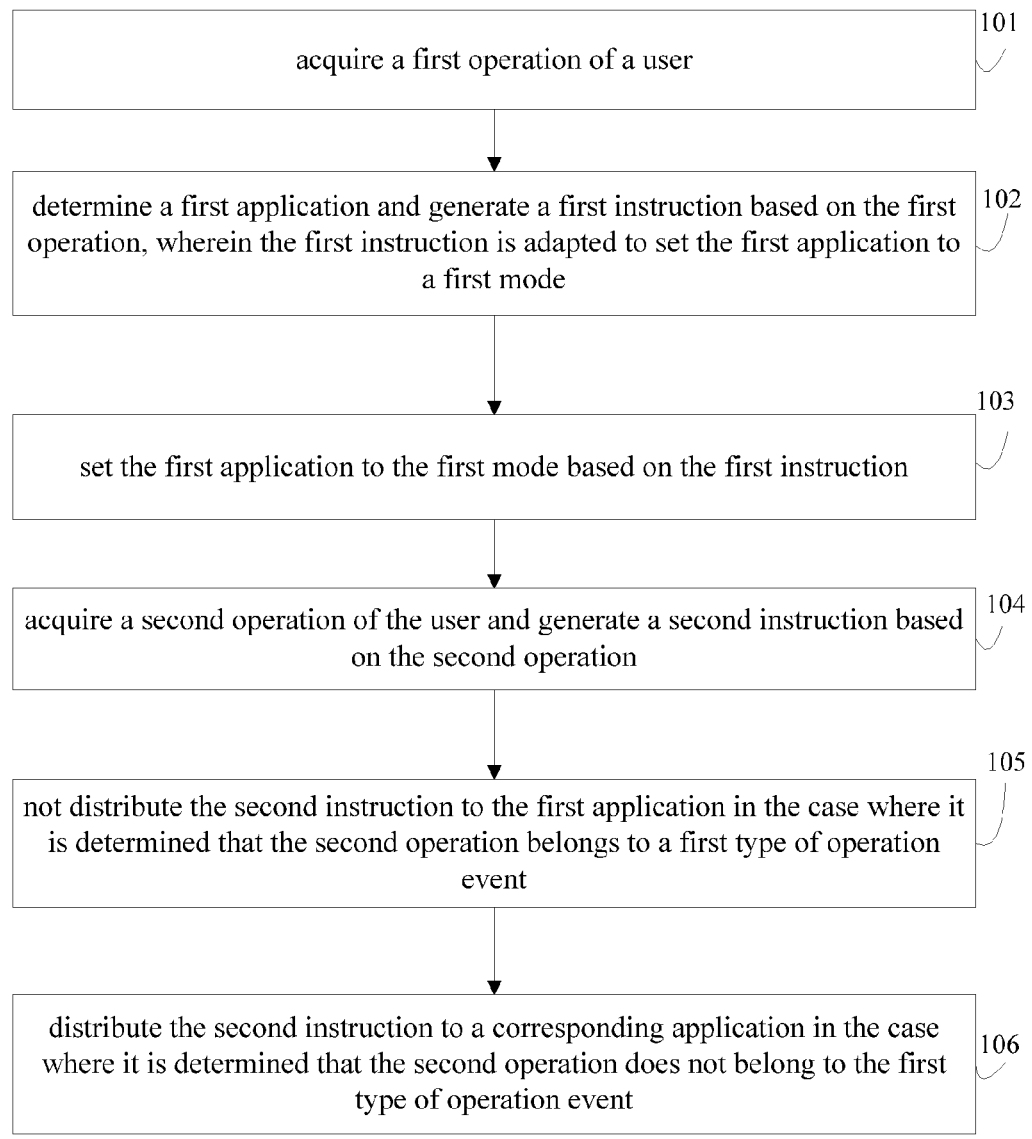
FIG. 1 is a schematic flowchart for a method for information processing according to an embodiment of the disclosure.

A method for information processing and an electronic apparatus thereof are provided according to the embodiments of the disclosure. The electronic apparatus has a touch display unit, and a plurality of applications may be run on the electronic apparatus. An application may be displayed on the touch display unit through a full-screen window mode or a small window mode. A display area of the full-screen window is equal to an area in which a touch event may be accepted by the touch display unit. A display area of the small window is smaller than the area in which the touch display unit may accept a touch event. The display area of the small window is smaller than the display area of the full-screen window.

The small window is obtained through transforming the full-screen window by using a first transforming parameter.

In the embodiment of the disclosure, the application run on the electronic apparatus may be an application pre-loaded in the electronic apparatus system, such as, a clock application, a camera application and a contacts application, or may be a third-party application installed by the user, such as, a micro-channel application, a game application, a browser application, an instant messaging application, an email application and a management application, etc.

In general, all the applications are displayed on a desktop of the electronic apparatus in the form of an interactive object, with one application being corresponding to one interactive object. The interactive object may be an object identity, and the object identity typically is an icon. An application corresponding to an object identity may be started by performing an operation on the object identity corresponding to the application. For example, on a desktop of an electronic apparatus such as a mobile phone, in the case where a user touches an icon corresponding to a contacts application, the contacts application may be started, so as to display the contacts recorded in the contacts application on the touch display unit. In the case where the application is started via the desktop, the application will be displayed on the display screen of the electronic apparatus through a full-screen window mode.

In this embodiment of the disclosure, a first transforming parameter may be pre-stored in a database of the electronic apparatus. The first transforming parameter at least includes a parameter, a matrix, a parameter group or a parameter set. For example, in practice, the first transforming parameter may be embodied in a manner of matrix, and may also be embodied in a manner of parameter group, where the parameter in the parameter group may be a specific value, or may be a vector. In the following, the first transforming parameter is implemented in a manner of matrix, which is defined specifically as a first matrix in the embodiment of the disclosure. The first matrix may be previously stored in a matrix library of the electronic apparatus. A full-screen window of the application may be transformed by using the first matrix, so as to generate a small window. For example, a reduction transformation, a translation transformation, a shape transformation and the like are performed on the full-screen window, so as to transform the full-screen window into a small window.

Graphics buffer data of an application in the full-screen window mode is converted by the first matrix, so as to generate graphics buffer data of the application in the small window mode. Through performing a transformation on the Graphics buffer data in the full-screen window mode, a display effect that the full-screen window of the application may be reduced to form a small window is obtained. And then the application may be displayed on the touch display unit through the small window, and a translation transformation, a shape transformation, an angle transformation and the like may be performed on the small window by the first matrix.

Optionally, the first matrix may be preset by the manufacturer of electronic apparatus, may also be manually set in the electronic apparatus by a user. To facilitate manually setting the first matrix by the user, the electronic apparatus provides a matrix automatic generation function. Only some parameters associated with the first matrix are needed to be set on the electric apparatus by the user, such as a window abscissa scaling parameter, a window ordinate scaling parameter, a window translation parameter, a window shape parameter, and a window angle rotation parameter and the like, and then a corresponding first matrix is generated by the electronic apparatus based on above parameters.

Here, a scaling transformation and a rotation transformation are performed on the full-screen window of the first application by using the first matrix, which may be implemented by Equation (1a):

$$\begin{pmatrix} x_2 \\ y_2 \\ z_2 \end{pmatrix} = \begin{pmatrix} M_{11} & M_{12} & M_{13} \\ M_{21} & M_{22} & M_{23} \\ M_{31} & M_{32} & M_{33} \end{pmatrix} \times \begin{pmatrix} x_1 \\ y_1 \\ z_1 \end{pmatrix} \quad (1a)$$

In the Equation (1a), $$\begin{pmatrix} x_2 \\ y_2 \\ z_2 \end{pmatrix}$$

is a coordinate vector of small window, $x_2$ is an abscissa of small window, $y_2$ is an ordinate of small window, and $z_2$ is generally defaulted to 1.

$$V = \begin{pmatrix} M_{11} & M_{12} & M_{13} \\ M_{21} & M_{22} & M_{23} \\ M_{31} & M_{32} & M_{33} \end{pmatrix},$$

V represents the first matrix, and the first matrix is a 3×3 matrix, $M_{ij}$ represents an element in the ith row in the jth column, where the value of i may be 1, 2 or 3; the value of j is 1, 2 or 3;

$$\begin{pmatrix} x_1 \\ y_1 \\ z_1 \end{pmatrix}$$

represents a coordinate vector of full-screen window, $x_1$ is an abscissa of full-screen window, $y_1$ is an ordinate of full-screen window, and $z_1$ is generally defaulted to 1.

In the case where a scaling is performed on the full-screen window by the Equation (1a), four elements in the $M_{ij}$ are set as follows: $M_{11}=\alpha$, $M_{12}=0$, $M_{21}=0$, $M_{22}=\beta$ and other five elements may be set randomly. Therefore, parameters set above may be substituted into the Equation (1a), so as to obtain Equation (2a):

$$x_2 = \alpha \times x_1$$

$$y_2 = \beta \times y_1 \quad (2a)$$

Where $\alpha$ is an abscissa scaling parameter, and $\beta$ is an ordinate scaling parameter.

In the case where a clockwise rotation transformation is performed on the full-screen window by the Equation (1a), four elements in the $M_{ij}$ are set as follows: $M_{11}=\cos\theta$, $M_{12}=\sin\theta$, $M_{21}=-\sin\theta$, $M_{22}=\cos\theta$, and other five elements may be set randomly. Therefore, parameters set above may be substituted into the Equation (1a), so as to obtain Equation (3a):

$$x_2 = \cos\theta \times x_1 + \sin\theta \times y_1$$

$$y_2 = -\sin\theta \times x_1 + \cos\theta \times y_1 \quad (3a)$$

Where $\theta$ is a rotation angle.

A translation transformation is performed on the full-screen window of the first application by using the first matrix, which may be implemented by Equation (4a):

$$\begin{pmatrix} x_2 \\ y_2 \\ z_2 \end{pmatrix} = \begin{pmatrix} M_{11} \\ M_{21} \\ M_{31} \end{pmatrix} + \begin{pmatrix} x_1 \\ y_1 \\ z_1 \end{pmatrix} \quad (4a)$$

In the case where a translation transformation is performed on the full-screen window by the Equation (4a), two elements in the $M_{ij}$ are set as follows: $M_{11}=a$, $M_{21}=b$, $M_{31}=0$. Thus, parameters set above may be substituted into the Equation (4a), so as to obtain Equation (5a):

$$x_2 = a + x_1$$

$$y_2 = b + y_1 \quad (5a)$$

Where a is an abscissa translation parameter, and b is an ordinate translation parameter.

In the embodiment described above, the full-screen window may have a plurality of coordinate vectors, and each coordinate vector is corresponding to one pixel position. Similarly, the small window may also have a plurality of coordinate vectors, and the number of the coordinate vectors of small window is corresponding to the number of the coordinate vectors of full-screen window. Each of the coordinate vectors of small window is also corresponding to one pixel position which is the pixel corresponding to the full-screen window.

In practice, elements in the first matrix may also be set into other values, so as to transform the full-screen window into a desired small window. And in the case where a scaling operation, a translation operation and a rotation operation are performed simultaneously on the full-screen window, elements in the first matrix may be set, so that the scaling operation, the translation operation and the rotation operation may be performed simultaneously.

In the embodiment of the disclosure, the first matrix may be other matrixes, e.g., a 4×4 square matrix. Dimension of the square matrix may be changed by the skilled in the art as actual required, which is not described here.

The technology solution of the disclosure will be described below further in detail in conjunction with the appended drawings and the specific embodiments.

An embodiment of the present disclosure provides a method for information processing and an electronic apparatus thereof with a touch display unit. A plurality of applications may be run on the electronic apparatus. An application may be displayed on the touch display unit through a full-screen window mode or a small window mode. A display area of the full-screen window is equal to an area in which a touch event may be accepted by the touch display unit. A display area of the small window is smaller than the area in which a touch event may be accepted by the touch display unit. The display area of the small window is smaller than the display area of the full-screen window. The small window is obtained through transforming the full-screen window by using a first transforming parameter. FIG. 1 is a schematic flowchart for a method for information processing according to an embodiment of the disclosure. As shown in FIG. 1, the method includes the following steps 101 to 106.

Step 101, acquiring a first operation of a user.

Step 102, determining a first application and generating a first instruction based on the first operation, wherein the first instruction is adapted to set the first application to a first mode.

Step 103, setting the first application to the first mode based on the first instruction.

Step 104, acquiring a second operation of the user and generating a second instruction based on the second operation.

Step 105, not distributing the second instruction to the first application in the case where it is determined that the second operation belongs to a first type of operation event.

Step 106, distributing the second instruction to a corresponding application in the case where it is determined that the second operation does not belong to the first type of operation event.

In this embodiment of the disclosure, the first type of operation event may be a key-pressing operation event.

In the embodiment provided in the disclosure, the first operation of the user is acquired. the first application is determined and the first instruction is generated based on the first operation, wherein the first instruction is adapted to set the first application to the first mode. The first application is set to the first mode based on the first instruction. The second operation of the user is acquired and the second instruction is generated based on the second operation. The second instruction is not distributed to the first application in the case where it is determined that the second operation belongs to a first type of operation event. And the second instruction is distributed to the corresponding application in the case where it is determined that the second operation does not belong to the first type of operation event. Therefore, the topping function may be achieved, and the user's experience is improved.

An embodiment of the present disclosure provides a method for information processing and an electronic apparatus thereof with a touch display unit. A plurality of applications may be run on the electronic apparatus. The application may be displayed on the touch display unit through a full-screen window mode or a small window mode. A display area of the full-screen window is equal to an area in which a touch event may be accepted by the touch display unit. A display area of the small window is smaller than the area in which a touch event may be accepted by the touch display unit. The display area of the small window is smaller than the display area of the full-screen window. The small window is obtained through transforming the full-screen window by using a first transforming parameter. FIG. 2 is a schematic flowchart for a method for information processing according to an embodiment of the disclosure. As shown in FIG. 2, the method includes the following steps 201 to 206.

Step 201, acquiring a first operation of a user.

Step 202, determining a first application and generating a first instruction based on the first operation, wherein the first instruction is adapted to set the first application to a first mode.

Step 203, determining a second application in a resumed state and a first value of a first parameter of the second application based on the first instruction, and modifying a value of a first parameter of the first application to be larger than the first value.

Here, the first parameter indicates the priority of display of the application, and the greater value of the first parameter of the application is, the higher the priority of the application is. In practice, for example an Android operating system is applied, Z value may be modified. The Z value of the first application to be topped is set to the maximum, so that the first application topped will be displayed always on the forefront at the time of displaying. Here the Z value is a parameter for displaying in the Android operating system.

Step 204, acquiring a second operation of the user and generating a second instruction based on the second operation.

Step 205, not distributing the second instruction to the first application in the case where it is determined that the second operation belongs to a first type of operation event.

Step 206, distributing the second instruction to a corresponding application in the case where it is determined that the second operation does not belong to the first type of operation event.

In this embodiment of the disclosure, the first type of operation event may be a key-pressing operation event.

A manner of setting the first application to the first mode is provided according to the embodiment of the disclosure. That is, the second application in resumed state and the first value of the first parameter of the second application are determined firstly, and then the value of the first parameter of the first application is modified so that the value of the first parameter of the first application is larger than the first value. Therefore, the determined first application may be topped simply and fast with the technology solution according to the embodiment of the disclosure.

Figure 3:
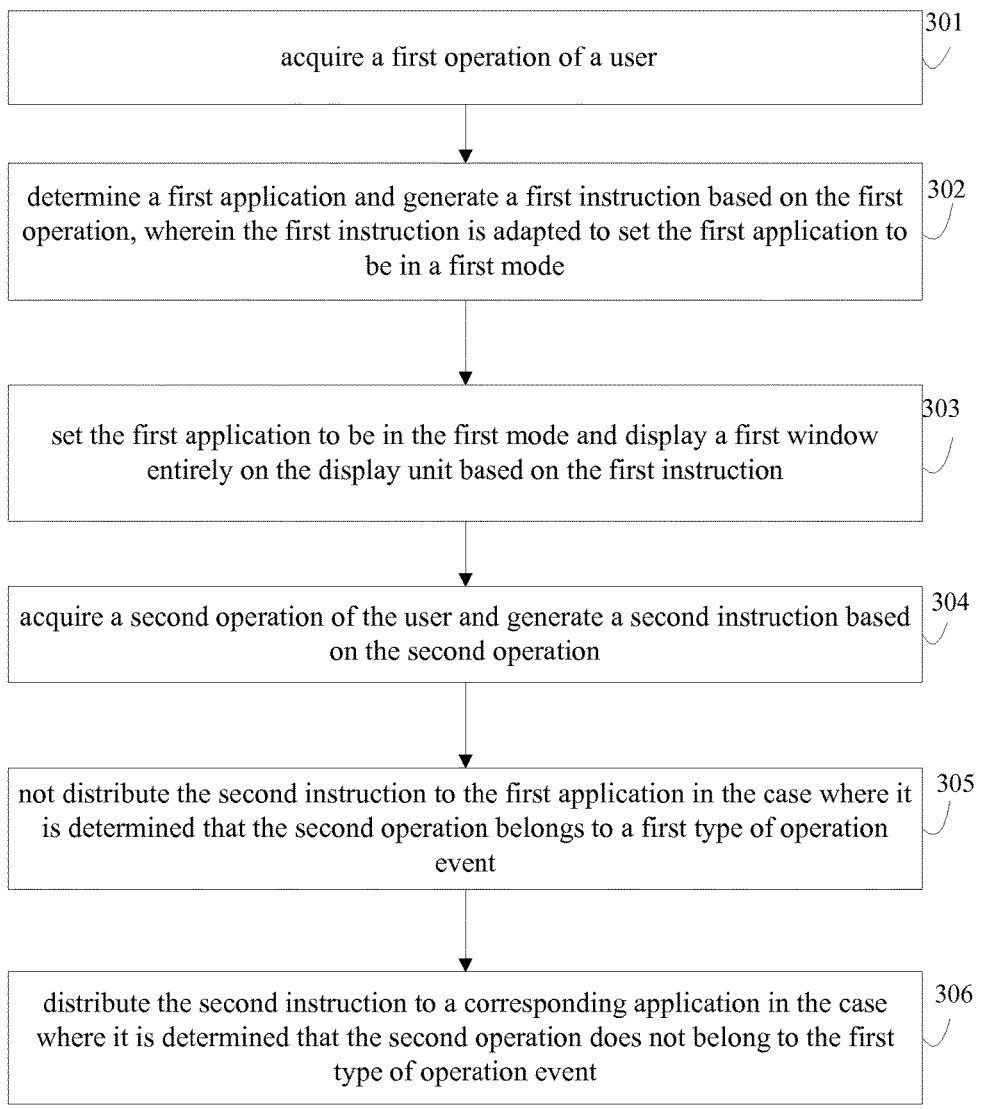
FIG. 3 is a schematic flowchart for a method for information processing according to an embodiment of the disclosure.

An embodiment of the present disclosure provides a method for information processing and an electronic apparatus thereof with a touch display unit. A plurality of applications may be run on the electronic apparatus. An application may be displayed on the touch display unit through a full-screen window mode or a small window mode. A display area of the full-screen window is equal to an area in which a touch event may be accepted by the touch display unit. A display area of the small window is smaller than the area in which a touch event may be accepted by the touch display unit. The display area of the small window is smaller than that of the full-screen window. The small window is obtained through transforming the full-screen window by using a first transforming parameter. In the case where the number of application windows displayed by the touch display unit is over two and there is an overlapping region between a first window for displaying the first application and other small windows displayed on a display unit. FIG. 3 is a schematic flowchart for a method for information processing according to an embodiment of the disclosure. As shown in FIG. 3, the method includes the following steps 301 to 306.

Step 301, acquiring a first operation of a user.

Step 302, determining a first application and generating a first instruction based on the first operation, wherein the first instruction is adapted to set the first application to a first mode.

Step 303, setting the first application to the first mode and displaying a first window entirely on the display unit based on the first instruction.

Step 304, acquiring a second operation of the user and generating a second instruction based on the second operation.

Step 305, not distributing the second instruction to the first application in the case where it is determined that the second operation belongs to a first type of operation event.

Step 306, distributing the second instruction to a corresponding application in the case where it is determined that the second operation does not belong to the first type of operation event.

In this embodiment of the disclosure, the first type of operation event includes a key-pressing operation event.

In the embodiment of the disclosure, after the first application is set to the first mode, in the case where the number of application windows displayed by the touch display unit is over two and there is an overlapping region between a first window for displaying the first application and other small windows displayed on the display unit, a method for displaying the first application is provided.

Figure 4:
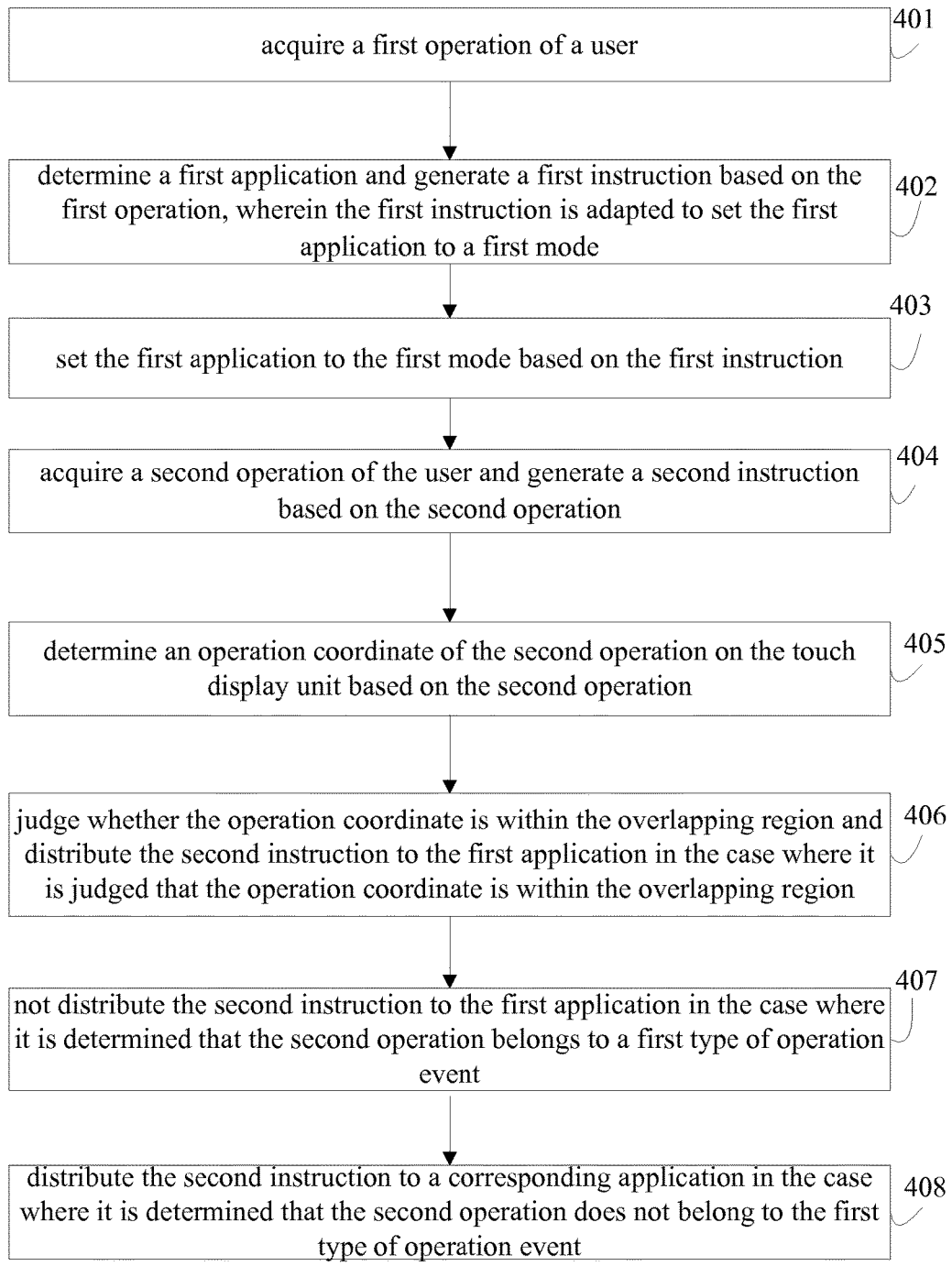
FIG. 4 is a schematic flowchart for a method for information processing according to an embodiment of the disclosure.

An embodiment of the present disclosure provides a method for information processing and an electronic apparatus thereof with a touch display unit. A plurality of applications may be run on the electronic apparatus. The application may be displayed on the touch display unit through a full-screen window mode or a small window. A display area of the full-screen window is equal to an area in which a touch event may be accepted by the touch display unit. A display area of the small window is smaller than the area in which a touch event may be accepted by the touch display unit. The display area of the small window is smaller than the display are of the full-screen window. The small window is obtained through transforming the full-screen window by using a first transforming parameter. After the first application is set the first mode, in the case where the number of application windows displayed by the touch display unit is over two and there is an overlapping region between a first window for displaying the first application and other small windows displayed on a display unit. FIG. 4 is a schematic flowchart for a method for information processing according to an embodiment of the disclosure. As shown in FIG. 4, the method includes the following steps 401 to 408.

Step 401, acquiring a first operation of a user.

Step 402, determining a first application and generating a first instruction based on the first operation, wherein the first instruction is adapted to set the first application to a first mode.

Step 403, setting the first application to the first mode based on the first instruction.

Step 404, acquiring a second operation of the user and generating a second instruction based on the second operation.

Step 405, determining an operation coordinate of the second operation on the touch display unit based on the second operation.

Step 406, judging whether the operation coordinate is within the overlapping region and distributing the second instruction to the first application in the case where it is judged that the operation coordinate is within the overlapping region.

Step 407, not distributing the second instruction to the first application in the case where it is determined that the second operation belongs to a first type of operation event.

Step 408, distributing the second instruction to a corresponding application in the case where it is determined that the second operation does not belong to the first type of operation event.

In this embodiment of the disclosure, the first type of operation event includes a key-pressing operation event.

In this embodiment of the disclosure, setting the first application to the first mode includes: determining a second application in a resumed state and a first value of a first parameter of the second application, and modifying a value of a first parameter of the first application to be larger than the first value.

Figure 5:
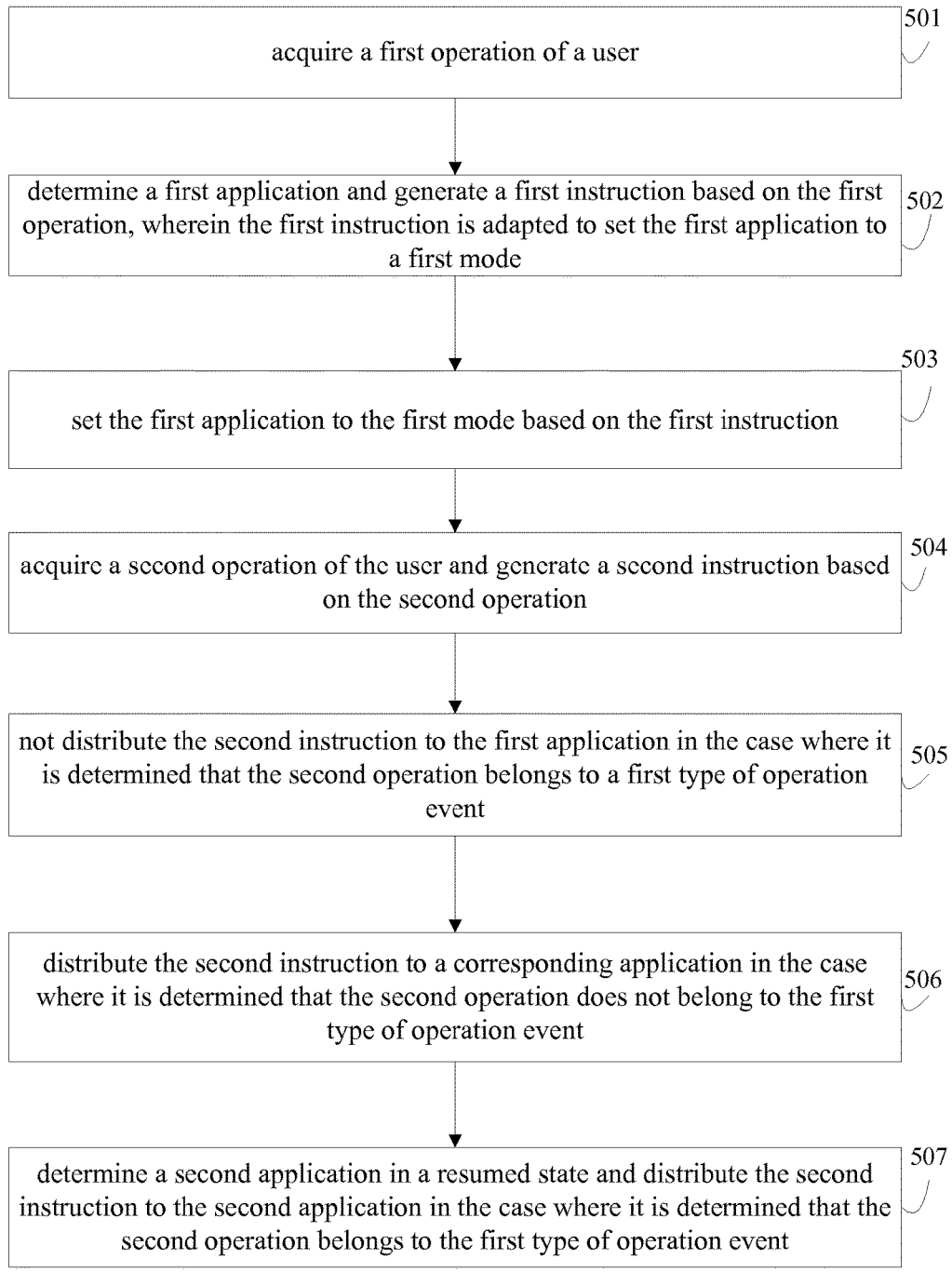
FIG. 5 is a schematic flowchart for a method for information processing according to an embodiment of the disclosure.

An embodiment of the present disclosure provides a method for information processing and an electronic apparatus thereof with a touch display unit. A plurality of applications may be run on the electronic apparatus. An application may be displayed on the touch display unit through a full-screen window mode or a small window mode. A display area of the full-screen window is equal to an area in which a touch event may be accepted by the touch display unit. A display area of the small window is smaller than the area in which a touch event may be accepted by the touch display unit. The display area of the small window is smaller than the display area of the full-screen window. The small window is obtained through transforming the full-screen window by using a first transforming parameter. FIG. 5 is a schematic flowchart for a method for information processing according to an embodiment of the disclosure. As shown in FIG. 5, the method includes the following steps 501 to 507.

Step 501, acquiring a first operation of a user.

Step 502, determining a first application and generating a first instruction based on the first operation, wherein the first instruction is adapted to set the first application to a first mode.

Step 503, setting the first application to the first mode based on the first instruction.

Step 504, acquiring a second operation of the user and generating a second instruction based on the second operation.

Step 505, not distributing the second instruction to the first application in the case where it is determined that the second operation belongs to a first type of operation event.

Step 506, distributing the second instruction to a corresponding application in the case where it is determined that the second operation does not belong to the first type of operation event.

Step 507, determining a second application in a resumed state and distributing the second instruction to the second application in the case where it is determined that the second operation belongs to the first type of operation event.

In this embodiment of the disclosure, the first type of operation event includes a key-pressing operation event.

In this embodiment of the disclosure, setting the first application to the first mode includes: determining a second application in a resumed state and a first value of a first parameter of the second application, and modifying a value of a first parameter of the first application to be larger than the first value.

In this embodiment of the disclosure, after the first application is set to the first mode, in the case where the number of application windows displayed by the touch display unit is over two and there is an overlapping region between a first window for displaying the first application and other small windows displayed on the display unit, the method further includes: displaying a first window entirely on the display unit.

In the case where the second operation is a touch operation and does not belong to the first type of operation event, distributing the second instruction to a corresponding application includes:

determining an operation coordinate of the second operation on the touch display unit based on the second operation;

judging whether the operation coordinate is within the overlapping region; and distributing the second instruction to the first application in the case where it is judged that the operation coordinate is within the overlapping region.

Figure 6:
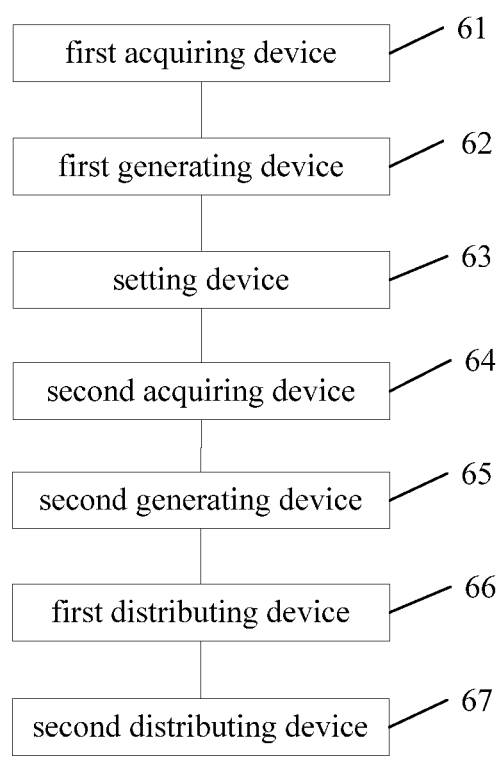
FIG. 6 is a schematic structural diagram of an electronic apparatus according to an embodiment of the disclosure.

An embodiment of the present disclosure provides an electronic apparatus with a touch display unit. A plurality of applications may be run on the electronic apparatus, and the application may be displayed on the touch display unit through a full-screen window mode or a small window mode. A display area of the full-screen window is equal to an area in which a touch event may be accepted by the touch display unit. A display area of the small window is smaller than the area in which a touch event may be accepted by the touch display unit. The display area of the small window is smaller than the display area of the full-screen window. The small window is obtained through transforming the full-screen window by using a first transforming parameter. FIG. 6 is a schematic structural diagram of an electronic apparatus according to an embodiment of the disclosure. As shown in FIG. 6, the electronic apparatus includes: a first acquiring device 61, a first generating device 62, a setting device 63, a second acquiring device 64, a second generating device 65, a first distributing device 66 and a second distributing device 67, wherein:

the first acquiring device 61 is adapted to acquire a first operation of a user;

the first generating device 62 is adapted to determine a first application and generate a first instruction based on the first operation, wherein the first instruction is adapted to set the first application to a first mode;

the setting device 63 is adapted to set the first application to the first mode based on the first instruction;

the second acquiring device 64 is adapted to acquire a second operation of the user;

the second generating device 65 is adapted to generate a second instruction based on the second operation;

the first distributing device 66 is adapted to not distribute the second instruction to the first application in the case where it is determined that the second operation belongs to a first type of operation event; and the second distributing device 67 is adapted to distribute the second instruction to a corresponding application in the case where it is determined that the second operation does not belong to the first type of operation event.

In this embodiment of the disclosure, the first type of operation event includes a key-pressing operation event.

In the embodiment provided in the disclosure, the first operation of the user is acquired by the first acquiring device 61; the first application is determined and the first instruction is generated based on the first operation by the first generating device 62, wherein the first instruction is adapted to set the first application to the first mode; the first application is set to the first mode by the setting device 63 based on the first instruction; the second operation of the user is acquired by the second acquiring device 64; the second instruction is generated by the second generating device 65 based on the second operation; the second instruction is not distributed to the first application by the first distributing device 66 in the case where it is determined that the second operation belongs to the first type of operation event; and the second instruction is distributed to the corresponding application by the second distributing device 67 in the case where it is determined that the second operation does not belong to the first type of operation event. Therefore, the topping function may be achieved, and the user's experience is improved.

Figure 7:
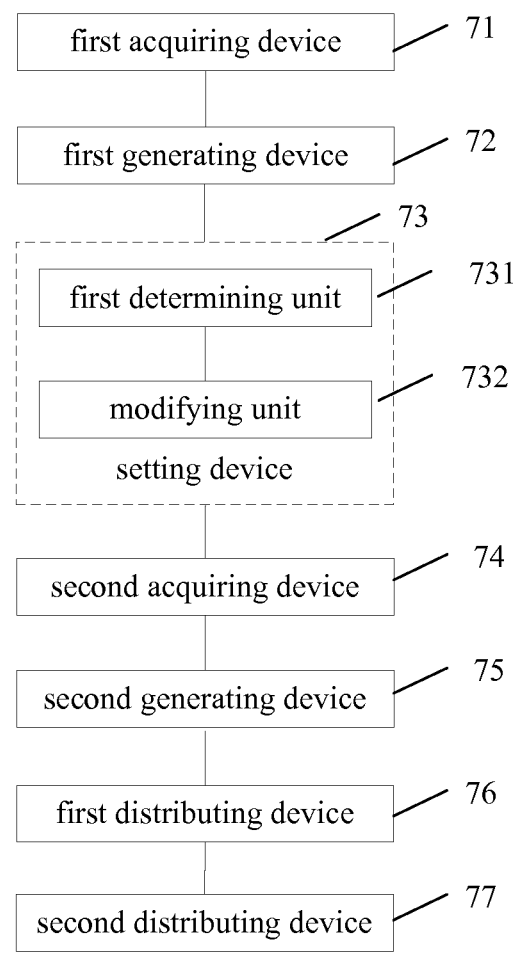
FIG. 7 is a schematic structural diagram of an electronic apparatus according to an embodiment of the disclosure.

An embodiment of the present disclosure provides an electronic apparatus with a touch display unit. A plurality of applications may be run on the electronic apparatus, and the application may be displayed on the touch display unit through a full-screen window mode or a small window mode. A display area of the full-screen window is equal to an area in which a touch event may be accepted by the touch display unit. A display area of the small window is smaller than the area in which a touch event may be accepted by the touch display unit. The display area of the small window is smaller than the display area of the full-screen window. The small window is obtained through transforming the full-screen window by using a first transforming parameter. FIG. 7 is a schematic structural diagram of an electronic apparatus according to an embodiment of the disclosure. As shown in FIG. 7, the electronic apparatus includes: a first acquiring device 71, a first generating device 72, a setting device 73, a second acquiring device 74, a second generating device 75, a first distributing device 76 and a second distributing device 77, wherein the setting device 73 includes a first determining unit 731 and a modifying unit 732, wherein:

the first acquiring device 71 is adapted to acquire a first operation of a user;

the first generating device 72 is adapted to determine a first application and to generate a first instruction based on the first operation, wherein the first instruction is adapted to set the first application to a first mode;

the first determining unit 731 is adapted to determine a second application in a resumed state and a first value of a first parameter of the second application based on the first instruction;

the modifying unit 732 is adapted to modify a value of a first parameter of the first application to be larger than the first value;

the second acquiring device 74 is adapted to acquire a second operation of the user;

the second generating device 75 is adapted to generate a second instruction based on the second operation;

the first distributing device 76 is adapted to not distribute the second instruction to the first application in the case where it is determined that the second operation belongs to a first type of operation event; and the second distributing device 77 is adapted to distribute the second instruction to a corresponding application in the case where it is determined that the second operation does not belong to the first type of operation event.

In this embodiment of the disclosure, the first type of operation event includes a key-pressing operation event.

A way for realizing the function of the setting device 73 is provided in the embodiment of the present disclosure. That is, a second application in a resumed state and a first value of a first parameter of the second application are determined firstly by the first determining unit 731, and then a value of a first parameter of the first application is modified by the modifying unit 732 to be larger than the first value. Therefore, the determined first application may be topped simply and fast by the technology solution according to the embodiment of the disclosure.

An embodiment of the present disclosure provides an electronic apparatus with a touch display unit. A plurality of applications may be run on the electronic apparatus, and the application may be displayed on the touch display unit through a full-screen window mode or a small window mode. A display area of the full-screen window is equal to an area in which a touch event may be accepted by the touch display unit. A display area of the small window is smaller than the area in which a touch event may be accepted by the touch display unit. The display area of the small window is smaller than the display area of the full-screen window. The small window is obtained through transforming the full-screen window by using a first transforming parameter. in the case where the number of application windows displayed by the touch display unit is over two and there is an overlapping region between a first window for displaying the first application and other small windows displayed on the display unit, the electronic apparatus includes: a first acquiring device, a first generating device, a setting device, a second acquiring device, a second generating device, a first distributing device and a second distributing device, wherein:

the first acquiring device is adapted to acquire a first operation of a user;

the first generating device is adapted to determine a first application and generate a first instruction based on the first operation, wherein the first instruction is adapted to set the first application to a first mode;

the setting device is adapted to set the first application to the first mode and display a first window entirely on the display unit based on the first instruction;

the second acquiring device is adapted to acquire a second operation of the user;

the second generating device is adapted to generate a second instruction based on the second operation;

the first distributing device is adapted to not distribute the second instruction to the first application in the case where it is determined that the second operation belongs to a first type of operation event; and the second distributing device is adapted to distribute the second instruction to a corresponding application in the case where it is determined that the second operation does not belong to the first type of operation event.

In this embodiment of the disclosure, the first type of operation event includes a key-pressing operation event.

In the embodiment of the disclosure, after the first application is set to the first mode, in the case where the number of application windows displayed by the touch display unit is over two and there is an overlapping region between a first window for displaying the first application and other small windows displayed on the display unit, the electronic apparatus including a display device adapted to display the first window entirely on the display unit is provided.

Figure 8:
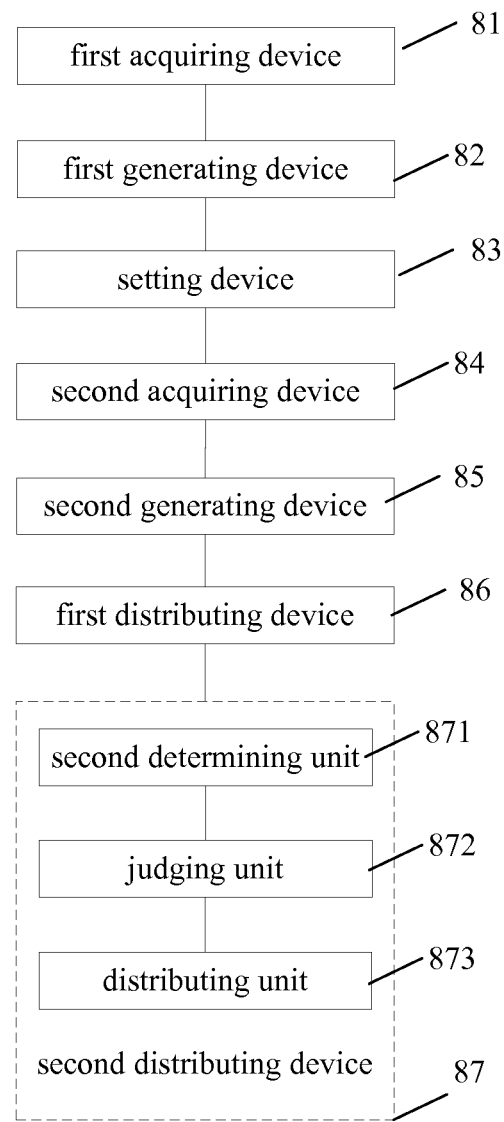
FIG. 8 is a schematic structural diagram of an electronic apparatus according to an embodiment of the disclosure.

An embodiment of the present disclosure provides an electronic apparatus with a touch display unit. A plurality of applications may be run on the electronic apparatus, and the application may be displayed on the touch display unit through a full-screen window mode or a small window mode. A display area of the full-screen window is equal to an area in which a touch event may be accepted by the touch display unit. A display area of the small window is smaller than the area in which a touch event may be accepted by the touch display unit. The display area of the small window is smaller than the display area of the full-screen window. The small window is obtained through transforming the full-screen window by using a first transforming parameter; in the case where the number of application windows displayed by the touch display unit is over two and there is an overlapping region between a first window for displaying the first application and other small windows displayed on the display unit, FIG. 8 is a schematic structural diagram of an electronic apparatus according to an embodiment of the disclosure. As shown in FIG. 8, the electronic apparatus includes: a first acquiring device 81, a first generating device 82, a setting device 83, a second acquiring device 84, a second generating device 85, a first distributing device 86 and a second distributing device 87, wherein the second distributing device 87 includes a second determining unit 871, a judging unit 872 and a distributing unit 873, wherein:

the first acquiring device 81 is adapted to acquire a first operation of a user;

the first generating device 82 is adapted to determine a first application and generate a first instruction based on the first operation, wherein the first instruction is adapted to set the first application to a first mode;

the setting device 83 is adapted to set the first application to the first mode and display a first window entirely on the display unit based on the first instruction;

the second acquiring device 84 is adapted to acquire a second operation of the user;

the second generating device 85 is adapted to generate a second instruction based on the second operation;

the first distributing device 86 is adapted to not distribute the second instruction to the first application in the case where it is determined that the second operation belongs to a first type of operation event;

the second determining unit 871 is adapted to determine an operation coordinate of the second operation on the touch display unit based on the second operation;

the judging unit 872 is adapted to judge whether the operation coordinate is within the overlapping region; and the distributing unit 873 is adapted to distribute the second instruction to the first application in the case where it is judged that the operation coordinate is within the overlapping region.

In this embodiment of the disclosure, the first type of operation event includes a key-pressing operation event.

In this embodiment of the disclosure, the setting device includes a first determining unit and a modifying unit. The first determining unit is adapted to determine a second application in a resumed state and a first value of a first parameter of the second application based on the first instruction; and the modifying unit is adapted to modify a value of a first parameter of the first application to be larger than the first value.

Figure 9:
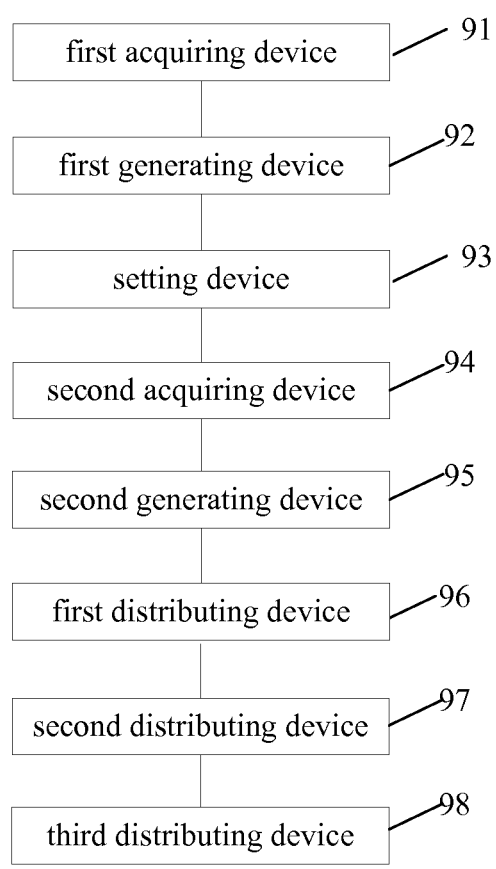
FIG. 9 is a schematic structural diagram of an electronic apparatus according to an embodiment of the disclosure.

An embodiment of the present disclosure provides an electronic apparatus with a touch display unit. A plurality of applications may be run on the electronic apparatus, and the application may be displayed on the touch display unit through a full-screen window mode or a small window mode. A display area of the full-screen window is equal to an area in which a touch event may be accepted by the touch display unit. A display area of the small window is smaller than the area in which a touch event may be accepted by the touch display unit. The display area of the small window is smaller than the display area of the full-screen window. The small window is obtained through transforming the full-screen window by using a first transforming parameter. FIG. 9 is a schematic structural diagram of an electronic apparatus according to an embodiment of the disclosure. As shown in FIG. 9, the electronic apparatus includes: a first acquiring device 91, a first generating device 92, a setting device 93, a second acquiring device 94, a second generating device 95, a first distributing device 96, a second distributing device 97, and a third distributing device 98, wherein:

the first acquiring device 91 is adapted to acquire a first operation of a user;

the first generating device 92 is adapted to determine a first application and generate a first instruction based on the first operation, wherein the first instruction is adapted to set the first application to a first mode;

the setting device 93 is adapted to set the first application to the first mode based on the first instruction;

the second acquiring device 94 is adapted to acquire a second operation of the user;

the second generating device 95 is adapted to generate a second instruction based on the second operation;

the first distributing device 96 is adapted to not distribute the second instruction to the first application in the case where it is determined that the second operation belongs to a first type of operation event;

the second distributing device 97 is adapted to distribute the second instruction to a corresponding application in the case where it is determined that the second operation does not belong to the first type of operation event; and the third distributing device 98 is adapted to determine a second application in a resumed state and distribute the second instruction to the second application in the case where it is determined that the second operation belongs to the first type of operation event.

In this embodiment of the disclosure, the first type of operation event includes a key-pressing operation event.

In this embodiment of the disclosure, the setting device includes a first determining unit and a modifying unit. The first determining unit is adapted to determine a second application in a resumed state and a first value of a first parameter of the second application based on the first instruction; and the modifying unit is adapted to modify a value of a first parameter of the first application to be larger than the first value.

In the embodiment of the disclosure, after the first application is set to be in the first mode, in the case where the number of application windows displayed by the touch display unit is over two and there is an overlapping region between a first window for displaying the first application and other small windows displayed on the display unit, an electronic apparatus further includes a display device adapted to display the first window entirely on the display unit.

In the embodiment of the present disclosure, in the case where the second operation is a touch operation and does not belong to the first type of operation event, the second distributing device includes: a second determining unit, a judging unit and a distributing unit, wherein the second determining unit is adapted to determine an operation coordinate of the second operation on the touch display unit based on the second operation; the judging unit is adapted to judge whether the operation coordinate is within the overlapping region; and the distributing unit is adapted to distribute the second instruction to the first application in the case where it is judged that the operation coordinate is within the overlapping region.

In each embodiment of the electronic apparatus and the information processing method according to the disclosure, the electronic apparatus includes a display unit. M first applications can be run on the display unit. The electronic apparatus can execute a first instruction. N first small windows are displayed on the display unit. The N first small windows correspond to the N first applications among the M first applications, such that each of the N first applications is displayed in a corresponding first small window. The first small window is obtained through transforming a full-screen window by using a first transformation parameter. A first application is displayed on the display unit by the corresponding first small window. Either of M or N is a positive integer.

The first application may be an application pre-installed in a system of the electronic apparatus, such as a clock application, a short massage application, an address book application or the like. The first application may also be a third party application installed by the user, such as a game application, a WeChat, a browser application, a live chat application, a mail application or the like.

The first application is displayed on the desktop of the electronic apparatus in a form of an interactive object. One first application corresponds to one interactive object. The interactive object may be an object identifier. This object identifier is generally an icon. By operating the object identifiers of the first application, the first application is displayed on the display unit via the first small window or the full-screen window, to facility the use by the user. For example, on the desktop of the electronic apparatus such as a mobile phone, in the case where the user touch an icon of a clock application on the desktop of the mobile phone, then this clock application may be opened, and this clock application is displayed on the display unit by the first small window or full-screen window.

In the disclosure, the full-screen window of the first application may be transformed by using the first transformation parameter to generate the first small window. For example, reduction transformation, shift transformation, rotating transformation and shape transformation or the like is performed on the full-screen window, and then the full-screen window is transformed to the first small window. The first transformation parameter may include at least one of a parameter, a matrix, a parameter group and a parameter set. In the implementation process, the first transformation parameter may be a matrix or a parameter group. Parameters of the parameter group may be some specific value, or may also be a vector.

In the following, a transformation progress from the full-screen window to the first small window by using a first matrix is described, wherein the first transformation parameter is a matrix and this matrix is regarded as the first matrix.

Here, the first matrix may be preset by the manufacturer of electronic apparatus, may also be manually set in the electronic apparatus by a user. To facilitate manually setting the first matrix by the user, the electronic apparatus provides a matrix automatic generation function. Only some parameters associated with the first matrix are needed to be set on the electric apparatus by the user, such as a window abscissa scaling parameter, a window ordinate scaling parameter, a window translation parameter, a window shape parameter, and a window angle rotation parameter and the like, and then a corresponding first matrix is generated by the electronic apparatus based on above parameters.

Here, a scaling transformation and a rotation transformation are performed on the full-screen window of the first application by using the first matrix, which may be implemented by Equation (1a):

$$\begin{pmatrix} x_2 \\ y_2 \\ z_2 \end{pmatrix} = \begin{pmatrix} M_{11} & M_{12} & M_{13} \\ M_{21} & M_{22} & M_{23} \\ M_{31} & M_{32} & M_{33} \end{pmatrix} \times \begin{pmatrix} x_1 \\ y_1 \\ z_1 \end{pmatrix} \qquad (1a)$$

In the Equation (1a), $$\begin{pmatrix} x_2 \\ y_2 \\ z_2 \end{pmatrix}$$

is a coordinate vector of small window, $x_2$ is an abscissa of small window, $y_2$ is an ordinate of small window, and $z_2$ is generally defaulted to 1.

$$V = \begin{pmatrix} M_{11} & M_{12} & M_{13} \\ M_{21} & M_{22} & M_{23} \\ M_{31} & M_{32} & M_{33} \end{pmatrix},$$

V represents the first matrix, and the first matrix is a 3×3 matrix, $M_{ij}$ represents an element in the ith row in the jth column, where the value of i may be 1, 2 or 3; the value of j is 1, 2 or 3;

$$\begin{pmatrix} x_1 \\ y_1 \\ z_1 \end{pmatrix}$$

represents a coordinate vector of full-screen window, $x_1$ is an abscissa of full-screen window, $y_1$ is an ordinate of full-screen window, and $z_1$ is generally defaulted to 1.

In the case where a scaling is performed on the full-screen window by the Equation (1a), four elements in the $M_{ij}$ are set as follows: $M_{11}=\alpha$, $M_{12}=0$, $M_{21}=0$, $M_{22}=\beta$, and other five elements may be set randomly. Therefore, parameters set above may be substituted into the Equation (1a), so as to obtain Equation (2a):

$$x_2 = \alpha \times x_1$$

$$y_2 = \beta \times y_1 \quad (2a)$$

Where $\alpha$ is an abscissa scaling parameter, and $\beta$ is an ordinate scaling parameter.

In the case where a clockwise rotation transformation is performed on the full-screen window by the Equation (1a), four elements in the $M_{ij}$ are set as follows: $M_{11}=\cos\theta$, $M_{12}=\sin\theta$, $M_{21}=-\sin\theta$, $M_{22}=\cos\theta$, and other five elements may be set randomly. Therefore, parameters set above may be substituted into the Equation (1a), so as to obtain Equation (3a):

$$x_2 = \cos\theta \times x_1 + \sin\theta \times y_1$$

$$y_2 = -\sin\theta \times x_1 + \cos\theta \times y_1 \quad (3a)$$

Where $\theta$ is a rotation angle.

A translation transformation is performed on the full-screen window of the first application by using the first matrix, which may be implemented by Equation (4a):

$$\begin{pmatrix} x_2 \\ y_2 \\ z_2 \end{pmatrix} = \begin{pmatrix} M_{11} \\ M_{21} \\ M_{31} \end{pmatrix} + \begin{pmatrix} x_1 \\ y_1 \\ z_1 \end{pmatrix} \quad (4a)$$

In the case where a translation transformation is performed on the full-screen window by the Equation (4a), two elements in the $M_{ij}$ are set as follows: $M_{11}=a$, $M_{21}=b$, $M_{31}=0$. Thus, parameters set above may be substituted into the Equation (4a), so as to obtain Equation (5a):

$$x_2 = a + x_1$$

$$y_2 = b + y_1 \quad (5a)$$

Where a is an abscissa translation parameter, and b is an ordinate translation parameter.

In the embodiment described above, the full-screen window may have a plurality of coordinate vectors, and each coordinate vector is corresponding to one pixel position. Similarly, the small window may also have a plurality of coordinate vectors, and the number of the coordinate vectors of small window is corresponding to the number of the coordinate vectors of full-screen window. Each of the coordinate vectors of small window is also corresponding to one pixel position which is the pixel corresponding to the full-screen window.

The graphic buffer data of the first application under the full-screen window may be transformed by the first matrix to generate the graphic buffer data of this first application under the first small window. By the transformation of the graphic buffer data under the full-screen window, it may be achieved in a display effect that the full-screen window of the first application is reduced so as to form the corresponding first small window, and then the first application is displayed on the display screen of the electronic apparatus in a small window state.

In practice, elements in the first matrix may also be set into other values, so as to transform the full-screen window into a desired small window. And in the case where elements in the first matrix may be set, so that the scaling operation, the translation operation and the rotation operation may be performed simultaneously.

In the solution described above, the first matrix is a square matrix with 3 dimensions. Furthermore, square matrices with other dimensions such as 4×4 square matrix may be used. One skilled in the art may change the dimensions of the square matrices as actual required, which is not described here.

A method for information processing according to an embodiment of the disclosure is applied in an electronic apparatus. The electronic apparatus includes a display unit. M first applications can be run on the display unit. The electronic apparatus can execute a first instruction. N first small windows are displayed on the display unit. The N first small windows correspond to the N first applications among the M first applications, such that each of the N first applications is displayed in a corresponding first small window. The first small window is obtained through transforming a full-screen window by using a first transformation parameter. Either of M or N is a positive integer. In the case where the first application is displayed on the display unit through the corresponding first small window, a response mode of the first application includes a first response mode and a second response mode. The first response mode may be a small window response mode, and the second response mode may be an application response mode. The specific implementation progress that the first small window is obtained through transforming the full-screen window by using the first transformation parameter is described as above, which is not described here.

Figure 10:
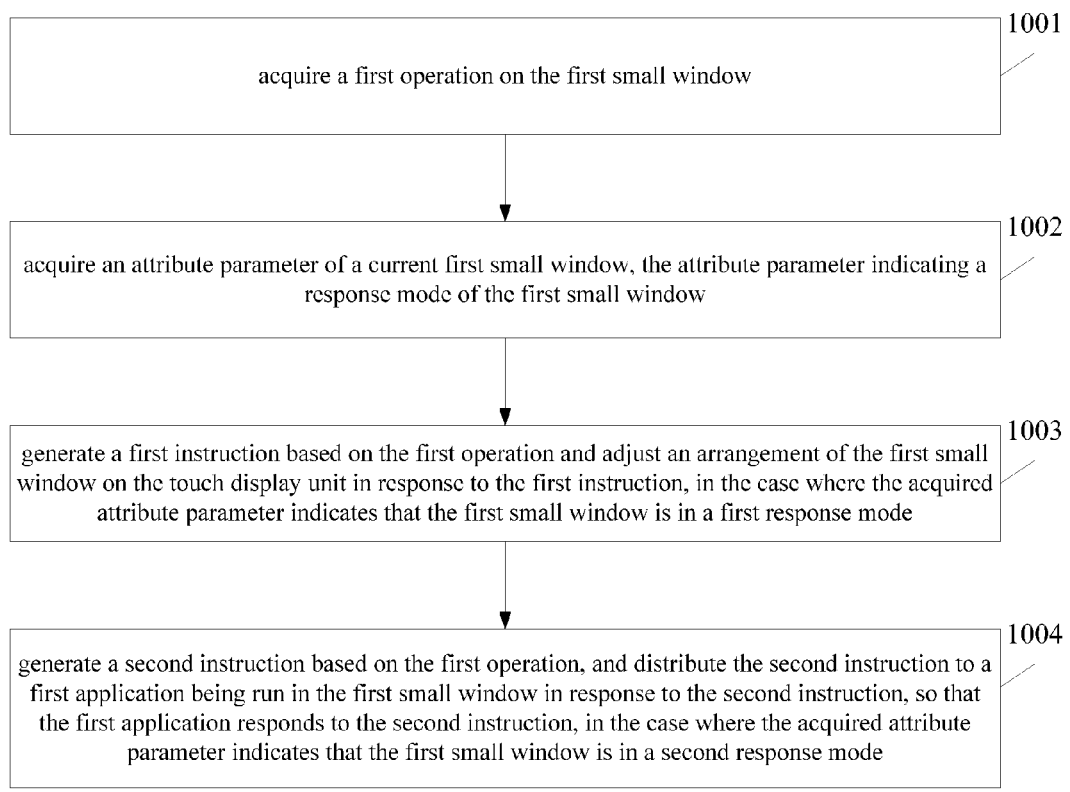
FIG. 10 is a flowchart for implementing an embodiment of a method for information processing according to the disclosure.

FIG. 10 is a flowchart for implementing an embodiment of the present disclosure provides a method for information processing. As illustrated in the FIG. 10, the method include:

Step 1001: acquiring a first operation on the first small window.

Here, the first operation is an adjusting operation on the first small window such as a translation, an enlargement, a reduction or the like to the first small window. Alternatively the first operation is an operation on the first application being run on the first small window such as an enlargement, a reduction or the like to the display element of the first application. The first operation may include at least one of a touch operation, a key pressing operation, a gesture operation and a voice operation. An adjustment to the arrangement of the first small window or an operation on the first application is implemented by the first operation.

Step 1002: acquiring an attribute parameter of a current first small window, the attribute parameter indicating a response mode of the first small window.

Here, the response mode of the first small window includes a small window response mode and an application response mode. The response mode of the current first small window may be set by the user as desired. In order to distinguish between the two modes, it is possible to preset a parameter corresponding to the two modes in a database of the electronic apparatus, and this parameter is served as the attribute parameter of the first small window in the corresponding mode. Different parameters used by the first small window indicate response modes corresponding to the different parameters.

Step 1003: in the case where the acquired attribute parameter indicates that the first small window is in the first response mode, a first instruction is generated based on the first operation. An arrangement of the first small window on the display unit is adjusted in response to the first instruction.

Here, in the case where the attribute parameter of the first small window indicates that the first small window is in the small window response mode, it is shown that the acquired first operation is an adjusting operation on the first small window itself.

Adjustment to the arrangement of first small window on the display unit includes:

an adjustment to a displaying area of the first small window on the display unit, such as a translation transformation, or a rotate transformation, or a translation and rotate transformation, or a shape transformation to the first small window;

or an adjustment to a window size of the first small window in the case where the first small window is displayed on the display unit, such as an enlargement or a reduction to the first small window;

or an adjustment to the displayed or hidden state of the first small window on the display unit, such as transformation of the first small window from a displayed state to a hidden state or transformation of the first small window from the hidden state to the displayed state.

Step 1004: in the case where the acquired attribute parameter indicates that the first small window is in the second response mode, a second instruction is generated based on the first operation. The second instruction is distributed to a first application being run on the first small window in response to the second instruction, so that the first application responds to the second instruction.

Here, in the case where the attribute parameter indicates that the first small window is in the application response mode, it is shown that the first operation is an operation on the first application itself. The second instruction should be send to the first application, and the first application makes response to the second instruction. The response made by the first application to the second instruction may be a control on the enlargement, reduction, or translation of the display element of the first application; or may be further a control on the displayed or hidden state of the first application; or may be further a control on the bounding box scale size of the first application or the like. The response mode of the first application to the second instruction may be referred to relevant instructions for the operation on the application by the user in the conventional technology, which is not described here.

Thus it can be seen that the first small window is provided with the two response modes including the small window response mode and the application response mode in the embodiment of the disclosure. The distinguishing between the operation on the window and the operation on the application is achieved, the use of the electronic apparatus by the user is facilitated, the user's experience is improved and also the humanity of the electronic apparatus embodied.

A method for information processing according to an embodiment of the disclosure is applied in an electronic apparatus. The electronic apparatus includes a display unit. M first applications may be run on the display unit. The electronic apparatus may execute a first instruction. N first small windows are displayed on the display unit. The N first small windows correspond to the N first applications among the M first applications, such that each of the N first applications is displayed in a corresponding first small window. The first small window is obtained through transforming a full-screen window by using a first transformation parameter. Either of M or N is a positive integer. In the case where the first application is displayed on the display unit through the corresponding first small window, a response mode of the first application includes a first response mode and a second response mode. The first response mode may be a small window response mode, and the second response mode may be an application response mode. The specific implementation progress that the first small window is obtained through transforming the full-screen window by using the first transformation parameter is described as above, which is not described here.

Figure 11:
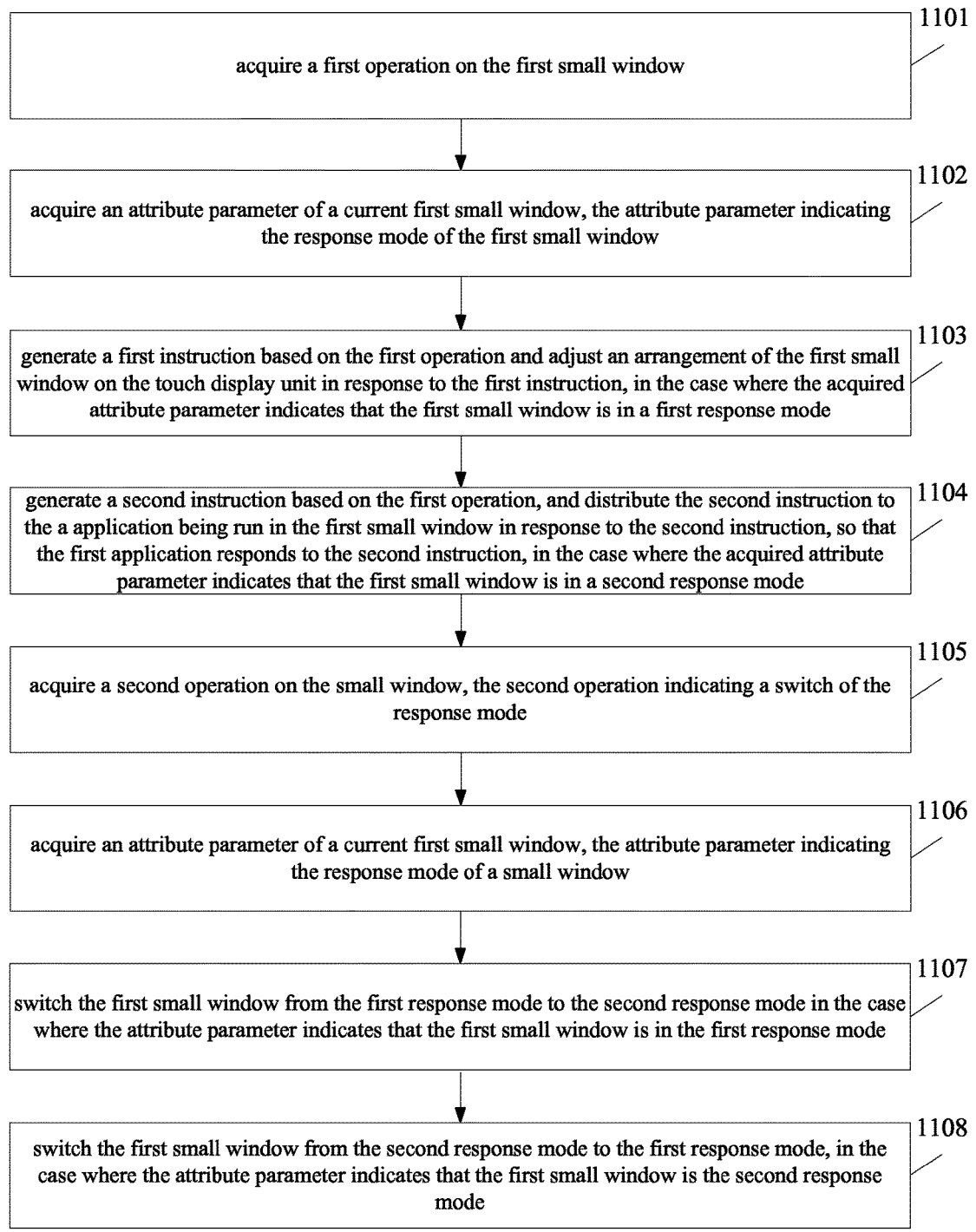
FIG. 11 is a flowchart for implementing an embodiment of a method for information processing according to the disclosure.

FIG. 11 is a flowchart for implementing an embodiment of the present disclosure provides a method for information processing. As illustrated in the FIG. 11, the method include:

Step 1101: acquiring a first operation on the first small window.

Here, the first operation is an adjusting operation on the first small window such as a translation, an enlargement, a reduction or the like to the first small window. Alternatively the first operation is an operation on the first application being run on the first small window such as an enlargement, a reduction or the like to the display element of the first application. The first operation may include at least one of a touch operation, a key pressing operation, a gesture operation and a voice operation. An adjustment to the arrangement of the first small window or an operation on the first application is implemented by the first operation.

Step 1102: acquiring an attribute parameter of a current first small window, the attribute parameter indicating the response mode of the first small window.

Here, the response mode of the first small window includes a small window response mode and an application response mode. The response mode of the current first small window may be set by the user as desired. In order to distinguish between the two modes, it is possible to preset a parameter corresponding to the two modes in a database of the electronic apparatus, and this parameter is served as the attribute parameter of the first small window in the corresponding mode. Different parameters used by the first small window indicate response modes corresponding to the different parameters.

Step 1103: in the case where the acquired attribute parameter indicates that the first small window is in the first response mode, a first instruction is generated based on the first operation. An arrangement of the first small window on the display unit is adjusted in response to the first instruction.

Here, in the case where the attribute parameter of the first small window indicates that the first small window is in the small window response mode, it is shown that the acquired first operation is an adjusting operation on the first small window itself.

Adjustment to the arrangement of first small window on the display unit includes:

an adjustment to a displaying area of the first small window on the display unit, such as a translation transformation, or a rotate transformation, or a translation and rotate transformation, or a shape transformation to the first small window;

or an adjustment to a window size of the first small window in the case where the first small window is displayed on the display unit, such as an enlargement or a reduction to the first small window;

or an adjustment to the displayed or hidden state of the first small window on the display unit, such as transformation of the first small window from a displayed state to a hidden state or transformation of the first small window from the hidden state to the displayed state.

Step 1104: in the case where the acquired attribute parameter indicates that the first small window is in the second response mode, a second instruction is generated based on the first operation. The second instruction is distributed to a first application being run on the first small window in response to the second instruction, so that the first application responds to the second instruction.

Here, in the case where the attribute parameter indicates that the first small window is in the application response mode, it is shown that the first operation is an operation on the first application itself. The second instruction should be send to the first application, and the first application makes response to the second instruction. The response made by the first application to the second instruction may be a control on the enlargement, reduction, or translation of the display element of the first application; or may be further a control on the displayed or hidden state of the first application; or may be further a control on the bounding box scale size of the first application or the like. The response mode of the first application to the second instruction may be referred to the relevant instructions for the operation on the application by the user in the conventional technology which is not described here.

Step 1105: acquiring a second operation on the first small window, the second operation indicating a switch of the response mode.

Here, the second operation includes at least one of a touch operation, a key pressing operation, a gesture operation and a voice operation. Taking the touch operation as an example, in the case where the user performs a sliding operation on the first small window from left to right or from right to left, an operation for switching of the small window response mode by the touch operation is determined. Taking the key pressing operation as an example, a switching key is provided with the small window response mode, in the case where it is acquired that the switching key is pressed, the small window response mode is switched. Taking the gesture operation as an example, in the case where the first small window is operated by two fingers, or three fingers, or four fingers, this operation is determined to be a switching operation. Taking the voice operation as an example, in the case where a voice speak from the user is identified as "mode switching", or "mode conversion", or sentences similar to the meaning of the both above, the voice is determined a voice operation for switching of the small window response mode.

Here, in order to distinguish the first operation and the second operation, an operation condition may be set in advance, in the case where the operation on the first small window by the user satisfies the operation condition, the operation is determined the second operation; in the case where the operation on the first small window by the user does not satisfy the operation condition, the operation is determined the first operation. The operation condition may be a sliding operation operated as from left to right or vice versa, or a press to the switching key, or an operation by using three fingers or four fingers, or a voice operation with the meaning of mode switching.

Step 1106: acquiring an attribute parameter of a current first small window, the attribute parameter indicating a response mode of the first small window.

Step 1107: in the case where the attribute parameter indicates that the first small window is in the first response mode, the first small window is switched from the first response mode to the second response mode in response to the second operation.

Here, in the case where the attribute parameter indicates that the first small window is in the small window response mode, the first small window is switched from the small window response mode to the application response mode.

Step 1108: in the case where the attribute parameter indicates that the first small window is in the second response mode, the first small window is switched from the second response mode to the first response mode in response to the second operation.

Here, in the case where the attribute parameter indicates that the first small window is in the application response mode, the first small window is switched from the application response mode to the small window response mode.

Thus it can be seen in the embodiment of the disclosure that the first small window is provided with two response modes including the small window response mode and the application response mode. The distinguishing between the operation on the window and the operation on the application is achieved, the use of the electronic apparatus by the user is facilitated, the user's experience is improved and also the humanity of the electronic apparatus embodied.

Figure 12:
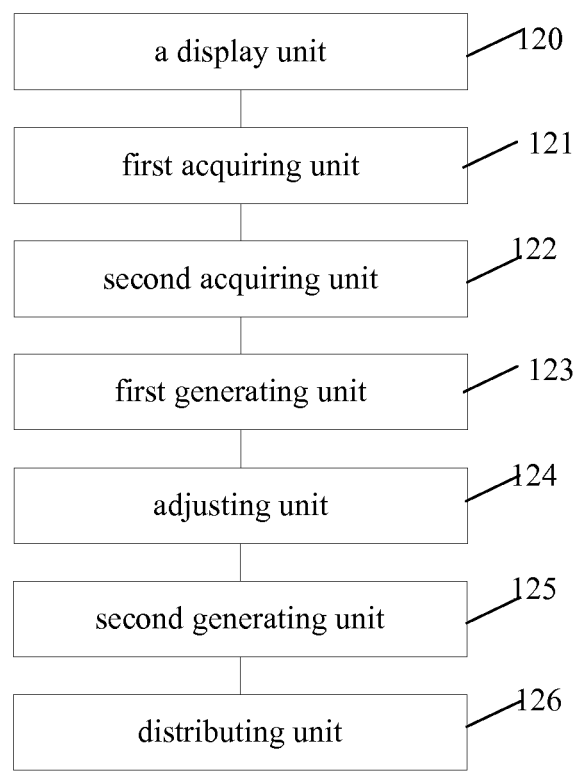
FIG. 12 is a structural schematic diagram of an embodiment of the electronic apparatus according to the disclosure.

FIG. 12 is a structural schematic diagram of an embodiment of the electronic apparatus according to the disclosure. As illustrated in FIG. 12, the electronic apparatus includes a display unit 120. M first applications may be run on the display unit 120. The electronic apparatus may execute a first instruction. N first small windows are displayed on the display unit 120. The N first small windows correspond to the N first applications among the M first applications, such that each of the N first applications is displayed in a corresponding first small window. The first small window is obtained through transforming a full-screen window by using a first transformation parameter. Either of M or N is a positive integer. In the case where the first application is displayed on the display unit 30 through the corresponding first small window, a response mode of the first application includes a first response mode and a second response mode. The first response mode may be a small window response mode, and the second response mode may be an application response mode. The process of the first small window being obtained through transforming the full-screen window by using the first transformation parameter is described, which is not described here.

As illustrated in FIG. 12, the electronic apparatus further includes a first acquiring unit 121, a second acquiring unit 122, a first generating unit 123, an adjusting unit 124, a second generating unit 125 and a distributing unit 36.

Specifically, the first acquiring unit 121 is adapted to acquire a first operation on the first small window.

Here, the first operation is an adjusting operation on the first small window such as a translation, an enlargement, a reduction or the like to the first small window. Alternatively the first operation is an operation on the first application being run on the first small window such as an enlargement, a reduction or the like to the display element of the first application. The first operation may include at least one of a touch operation, a key pressing operation, a gesture operation and a voice operation. An adjustment to the arrangement of the first small window or an operation on the first application is implemented by the first operation.

The second acquiring unit 122 is adapted to acquire an attribute parameter of a current first small window. The attribute parameter indicates the response mode of the first small window.

Here, the response mode of the first small window includes a small window response mode and an application response mode. The response mode of the current first small window may be set by the user as desired. In order to distinguish between the two modes, it is possible to preset a parameter corresponding to the two modes in a database of the electronic apparatus, and this parameter is served as the attribute parameter of the first small window in the corresponding mode. Different parameters used by the first small window indicate response modes corresponding to the different parameters.

The first generating unit 123 is adapted to generate a first instruction based on the first operation in the case where the acquired attribute parameter indicates that the first small window is in the first response mode.

Here, in the case where the attribute parameter of the first small window indicates that the first small window is in the small window response mode, it is shown that the first operation acquired by the first acquiring unit 121 is an adjusting operation on the first small window itself.

The adjusting unit 124 is adapted to adjust the arrangement of the first small window on the display unit 120 in response to the first instruction.

In detail, the adjusting unit 124 may be adapted to adjust the displaying area of the first small window on the display unit 120, such as a translation transformation, or a rotate transformation, or a translation and rotate transformation, or a shape transformation to the first small window; or to adjust a window size of the first small window in the case where the first small window is displayed on the display unit 120, such as an enlargement or a reduction to the first small window; or to adjust the displayed or hidden state of the first small window on the display unit 120, such as transformation to the first small window from the displayed state to the hidden state or transformation to the first small window from the hidden state to the displayed state.

The second generating unit 125 is adapted to generate a second instruction based on the first application in the case where the acquired attribute parameter indicates that the first small window is in the second response mode.

The distributing unit 126 is adapted to distribute the second instruction to a first application being run on the first small window in response to the second instruction, and the first application responds to the second instruction.

Here, in the case where the attribute parameter indicates that the first small window is in the application response mode, it is shown that the first operation is an operation on the first application itself. The distributing unit 126 distributes the second instruction to the first application, and the first application makes a respond to the second instruction. The response made by the first application to the second instruction may be a control on the enlargement, reduction, or translation of the display element of the first application; or may be further a control on the displayed or hidden state of the first application; or may be further a control on the size of the bounding box scale of the first application or the like. The response mode of the first application to the second instruction may be referred to relevant instructions for the operation on the application by the user in the conventional technology, which is not described here.

Thus it can be seen that the first small window is provided with two response modes including the small window response mode and the application response mode in the first embodiment of the disclosure. The distinguishing between the operation on the window and the operation on the application is achieved, the use of the electronic apparatus by the user is facilitated, the user's experience is improved and also the humanity of the electronic apparatus embodied.

Figure 13:
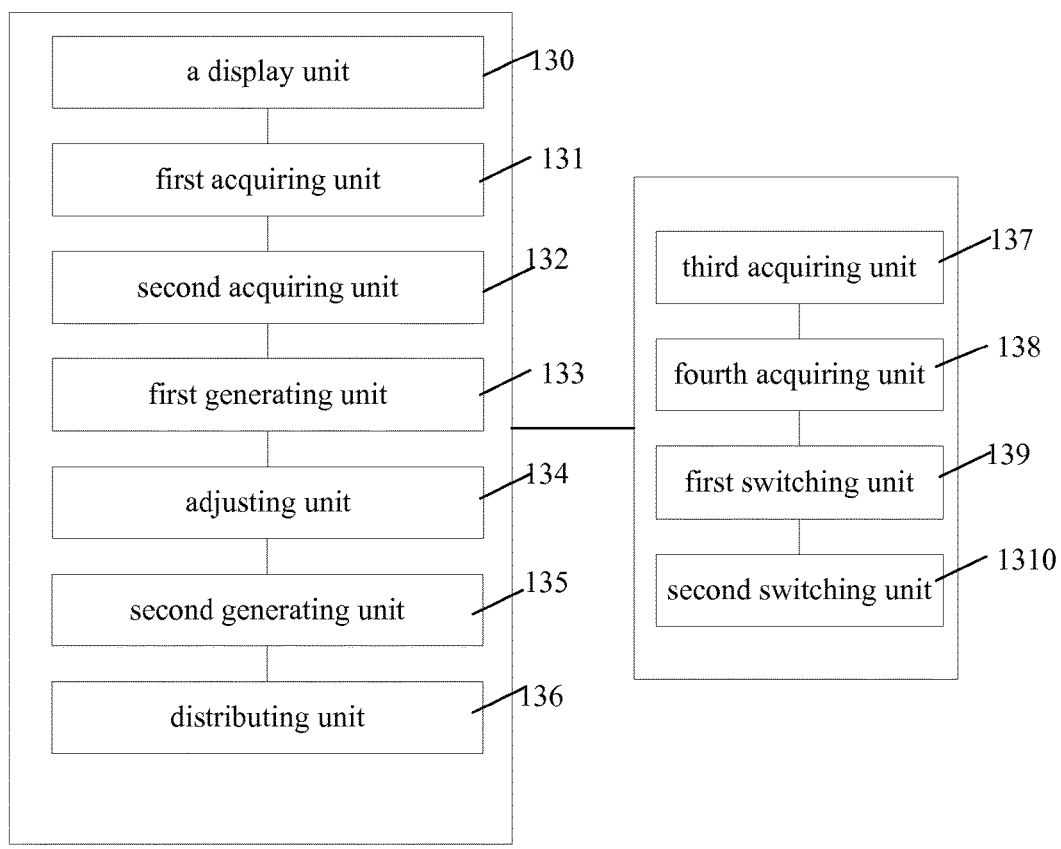
FIG. 13 is a structural schematic diagram of an embodiment of the electronic apparatus according to the disclosure.

FIG. 13 is a structural schematic diagram of an embodiment of the electronic apparatus according to the disclosure. As illustrated in FIG. 13, the electronic apparatus includes a display unit 130. M first applications may be run on the display unit 130. The electronic apparatus may execute a first instruction. N first small windows are displayed on the display unit 130. The N first small windows correspond to the N first applications among the M first applications, such that each of the N first applications is displayed on a corresponding first small window. The first small window is obtained through transforming a full-screen window by using a first transformation parameter. Either of M or N is a positive integer. In the case where the first application is displayed on the display unit 40 through the corresponding first small window, a response mode of the first application includes a first response mode and a second response mode. The first response mode may be a small window response mode, and the second response mode may be an application response mode. The process of the first small window being obtained through transforming the full-screen window by using the first transformation parameter is described, which is not described here.

As illustrated in FIG. 13, the electronic apparatus further includes a first acquiring unit 131, a second acquiring unit 132, a first generating unit 133, an adjusting unit 134, a second generating unit 135, a distributing unit 136, a third acquiring unit 137, a fourth acquiring unit 138, a first switching unit 139 and a second switching unit 1310.

The first acquiring unit 131 is adapted to acquire the first operation on the first small window.

Here, the first operation is an adjusting operation on the first small window such as a translation, an enlargement, a reduction or the like to the first small window. Alternatively the first operation is an operation on the first application being run on the first small window such as an enlargement, a reduction or the like to the display element of the first application. The first operation may be at least one of a touch operation, a key pressing operation, a gesture operation and a voice operation. An adjustment to the arrangement of the first small window or an operation on the first application is implemented by the first operation.

The second acquiring unit 132 is adapted to acquire an attribute parameter of a current first small window. The attribute parameter indicates the response mode of the first small window.

Here, the response mode of the first small window includes a small window response mode and an application response mode. The response mode of the current first small window may be set by the user as desired. In order to distinguish between the two modes, it is possible to preset a parameter corresponding to the two modes in a database of the electronic apparatus, and this parameter is served as the attribute parameter of the first small window in the corresponding mode. Different parameters used by the first small window indicate response modes corresponding to the different parameters.

The first generating unit 133 is adapted to generate a first instruction based on the first operation in the case where the acquired attribute parameter indicates that the first small window is in the first response mode.

Here, in the case where the attribute parameter of the first small window indicates that the first small window is in the small window response mode, it is shown that the first operation acquired by the first acquiring unit 131 is an adjusting operation on the first small window itself.

The adjusting unit 134 is adapted to adjust the arrangement of the first small window on the display unit 130 in response to the first instruction.

In detail, the adjusting unit 134 may be adapted to adjust the displaying area of the first small window on the display unit 130, such as a translation transformation, or a rotate transformation, or a translation and rotate transformation, or a shape transformation to the first small window; or to adjust a window size of the first small window in the case where the first small window is displayed on the display unit 130, such as an enlargement or a reduction to the first small window; or to adjust the displayed or hidden state of the first small window on the display unit 130, such as transformation to the first small window from the displayed state to the hidden state or transformation to the first small window from the hidden state to the displayed state.

The second generating unit 135 is adapted to generate a second instruction based on the first application in the case where the acquired attribute parameter indicates that the first small window is in the second response mode.

The distributing unit 136 is adapted to distribute the second instruction to a first application being run on the first small window in response to the second instruction, and the first application is in response to the second instruction.

Here, in the case where the attribute parameter indicates that the first small window is in the application response mode, it is shown that the first operation is an operation on the first application itself. The distributing unit 136 distributes the second instruction to the first application, and the first application makes a respond to the second instruction. The response made by the first application to the second instruction may be a control on the enlargement, reduction, or translation of the display element of the first application; may be further a control on the displayed or hidden state of the first application; or may be further a control on the size of the bounding box scale of the first application or the like. The response mode of the first application to the second instruction may be referred to relevant instructions for the operation on the application by the user in the conventional technology, which is not described here.

The third acquiring unit 137 is adapted to acquire the second operation on the first small window. The second operation indicates a switch of the response mode.

Here, the second operation includes at least one of a touch operation, a key pressing operation, a gesture operation and a voice operation. Taking the touch operation as an example, in the case where the user performs a sliding operation on the first small window from left to right or from right to left, an operation for switching of the small window response mode by the touch operation is determined. Taking the key pressing operation as an example, a switching key is provided with the small window response mode, in the case where it is acquired that the switching key is pressed, the small window response mode is switched. Taking the gesture operation as an example, in the case where the first small window is operated by two fingers, or three fingers, or four fingers, this operation is determined to be a switching operation. Taking the voice operation as an example, in the case where a voice speak from the user is identified as "mode switching", or "mode conversion", or the sentences similar to the meaning of the both above, the voice is determined an voice operation to switch the small window response mode. Of course, the second operation according to the embodiment of the disclosure is not limited to the above mentioned.

Here, in order to distinguish the first operation and the second operation, an operation condition may be set in advance, in the case where the operation on the first small window by the user satisfies the operation condition, the operation is determined the second operation; in the case where the operation on the first small window by the user does not satisfy the operation condition, the operation is determined the first operation. The operation condition may be a sliding operation operated as from left to right or vice versa, or a press to the switching key, or an operation by using three fingers or four fingers, or a voice operation with the meaning of mode switching.

The fourth acquiring unit 138 is adapted to acquire an attribute parameter of a current first small window. The attribute parameter indicates the response mode of the first small window.

The first switching unit 139 is adapted to switch the first small window from the first response mode to the second response mode in response to the second operation in the case where the attribute parameter indicates that the first small window is in the first response mode.

Here, in the case where the attribute parameter indicates that the first small window is in the small window response mode, the first switching unit 139 switches the first small window from the small window response mode to the application response mode.

The second switching unit 1310 is adapted to switch the first small window from the second response mode to the first response mode in response to the second operation in the case where the attribute parameter indicates that the first small window is in the second response mode.

Here, in the case where the attribute parameter indicates that the first small window is the application response mode, the second switching unit 1310 switches the first small window from the application response mode to the small window response mode.

Thus it can be seen in the embodiment of the disclosure that the first small window is provided with two response modes including the small window response mode and the application response mode. The distinguishing between the operation on the window and the operation on the application is achieved, the use of the electronic apparatus by the user is facilitated, the user's experience is improved and also the humanity of the electronic apparatus embodied.

In the case where the integrated unit of the present disclosure is achieved in a software functional module and sold or used as a separate product, it may also be stored in a computer readable storage medium. In view of the above mentioned, the substance or the part which contributes to the conventional technology of the technical solution of an embodiment of the disclosure may be embodied in a software product. The computer software product may be stored in a storage medium and may include several instructions for causing a desktop computer (may be a personal computer, a server or a network apparatus) to perform a part or the whole of the method according to the embodiments of the disclosure. The storage medium may include mediums such as a movable storage device, ROM (Read-Only Memory), magnetic disc or optical disc, which may store program codes.

The above-described are only the preferred embodiments of the present disclosure, and not intended to limit the scope of protection of the present disclosure.

The invention claimed is:

1. A method for information processing applied in an electronic apparatus, wherein the electronic apparatus comprises a display unit on which M first applications are run, the electronic apparatus executes a first instruction and displays N first small windows on the display unit; the N first small windows correspond to N first applications among the M first applications to make each of the N first applications displayed on a corresponding first small window, the first small window is obtained through transforming a full-screen window by using a first transformation parameter, wherein the first transforming parameter at least comprises a parameter, a matrix, a parameter group or a parameter set; either of M or N is a positive integer; in the case where a first application is displayed on the display unit through the corresponding first small window, a response mode of the first small window comprises a first response mode and a second response mode;

the method further comprises:

acquiring a first operation on the first small window;

in response to acquiring the first operation, acquiring a current attribute parameter of a current first small window, the current attribute parameter indicating the response mode of the current first small window;

generating a first instruction based on the first operation and adjusting an arrangement of the first small window on the display unit in response to the first instruction in the case where the acquired attribute parameter indicates that the first small window is in the first response mode;

generating a second instruction based on the first operation and distributing the second instruction to the first application being run in the first small window in response to the second instruction to make the first application respond to the second instruction in the case where the acquired attribute parameter indicates that the first small window is in the second response mode.

2. The method according to claim 1, wherein adjusting the arrangement of the first small window on the display unit comprises at least: adjusting a displaying area of the first small window on the display unit; or adjusting a window size of the first small window in the case where the first small window is displayed on the display unit; or adjusting a displayed or hidden state of the first small window on the display unit.

3. The method according to claim 1, wherein the method further comprises:

acquiring a second operation on the first small window, the second operation indicating a switch of the response mode;

acquiring the attribute parameter of the current first small window, the attribute parameter indicating the response mode of the first small window;

switching the first small window from the first response mode to the second response mode in response to the second operation in the case where the attribute parameter indicates that the first small window is in the first response mode; and switching the first small window from the second response mode to the first response mode in response to the second operation in the case where the attribute parameter indicates that the first small window is in the second response mode.

4. The method according to claim 3, wherein the second operation comprises at least one of a touch operation, a key pressing operation, a gesture operation or a voice operation.

5. An electronic apparatus, comprising a display unit on which M first applications can are run, wherein the electronic apparatus executes a first instruction, N first small windows are displayed on the display unit, the N first small windows correspond to N first applications among the M first applications to make each of the N first applications displayed on a corresponding first small window, the first small window is obtained through transforming a full-screen window by using a first transformation parameter, wherein the first transforming parameter at least comprises a parameter, a matrix, a parameter group or a parameter set; either of M or N is a positive integer; in the case where a first application is displayed on the display unit through the corresponding first small window, a response mode of the first small window comprises a first response mode and a second response mode;

the electronic apparatus further comprises a processor and a memory storing program instructions, wherein the processor performs the stored program instructions to:

acquire a first operation on the first small window;

in response to acquiring the first operation, acquire a current attribute parameter of a current first small window, the current attribute parameter indicates the response mode of the current first small window;

generate a first instruction based on the first operation in the case where the acquired attribute parameter indicates that the first small window is in the first response mode;

adjust an arrangement of the first small window on the display unit in response to the first instruction; generate a second instruction based on the first operation in the case where the acquired attribute parameter indicates that the first small window is in the second response mode;

distribute the second instruction to the first application being run on the first small window in response to the second instruction to make the first application respond to the second instruction.

6. The electronic apparatus according to claim 5, wherein the processor further performs the stored program instructions to adjust a displaying area of the first small window on the display unit; or to adjust a window size of the first small window in the case where the first small window is displayed on the display unit; or to adjust the displayed or hidden state of the first small window on the display unit.

7. The electronic apparatus according to claim 5, wherein the processor further performs the stored program instructions to: acquire the second operation on the first small window, the second operation indicates a switch of the response mode; acquire the attribute parameter of the current first small window, the attribute parameter indicates the response mode of the first small window;

switch the first small window from the first response mode to the second response mode in response to the second operation in the case where the attribute parameter indicates that the first small window is in the first response mode;

switch the first small window from the second response mode to the first response mode in response to the second operation in the case where the attribute parameter indicates that the first small window is in the second response mode.

8. The electronic apparatus according to claim 7, wherein the second operation comprises at least one of a touch operation, a key pressing operation, a gesture operation or a voice operation.

* * * * *